(12) United States Patent
Hagiwara

(10) Patent No.: US 8,537,250 B2
(45) Date of Patent: Sep. 17, 2013

(54) ZOOM LENS AND PHOTOGRAPHING APPARATUS

(75) Inventor: Hiroyuki Hagiwara, Yokohama (JP)

(73) Assignee: Samsung Electronics Co., Ltd, Suwon-Si (KR)

( * ) Notice: Subject to any disclaimer, the term of this patent is extended or adjusted under 35 U.S.C. 154(b) by 35 days.

(21) Appl. No.: 13/267,189

(22) Filed: Oct. 6, 2011

(65) Prior Publication Data

US 2012/0105693 A1 May 3, 2012

(30) Foreign Application Priority Data

Nov. 2, 2010 (JP) ................................ 2010-246611
Jun. 20, 2011 (KR) ....................... 10-2011-0059644

(51) Int. Cl.
*H04N 5/262* (2006.01)
*G02B 15/14* (2006.01)

(52) U.S. Cl.
USPC ....................................... 348/240.3; 359/684

(58) Field of Classification Search
CPC .. G02B 15/173; G02B 27/646; H04N 5/2254; H04N 5/23248; H04N 5/23258; H04N 5/23287
USPC ........... 348/208.11, 208.13, 240.3; 359/557, 359/683, 684, 687
See application file for complete search history.

(56) References Cited

U.S. PATENT DOCUMENTS 6,473,231 B2 * 10/2002 Hamano et al. ............... 359/557

* cited by examiner

*Primary Examiner* — David N Spector
(74) *Attorney, Agent, or Firm* — Drinker Biddle & Reath LLP

(57) ABSTRACT

A zoom lens according to the invention includes in order starting from an object side a first lens group having a positive refractive power; a second lens group having a negative refractive power and selectively moveable along an optical axis for zooming; an aperture stop; a third lens group having a positive refractive power and including a third-A lens group including a doublet lens including a positive lens and a negative lens and having at least one aspherical surface, selectively moveable along the optical axis for image blur compensation, and having a positive refractive power, and a third-B lens group including a positive lens and a negative lens; and a fourth lens group having a positive refractive power and selectively moveable along the optical axis to compensate for a variation in an image plane caused by the zooming and to perform focusing.

10 Claims, 21 Drawing Sheets

ZOOM LENS AND PHOTOGRAPHING APPARATUS

CROSS-REFERENCE TO RELATED PATENT APPLICATIONS

This application claims the priority benefit of Japanese Patent Application No. 2010-246611, filed on Nov. 2, 2010, in the Japanese Intellectual Property Office; and Korean Patent Application No. 10-2011-0059644, filed on Jun. 20, 2011, in the Korean Intellectual Property Office, the disclosures of which are incorporated herein in their entirety by reference.

BACKGROUND

1. Field of the Invention

The invention relates to a zoom lens and a photographing apparatus.

2. Description of the Related Art

An optical imaging system of a photographing apparatus such as a security camera, a video camera, a digital still camera, or a broadcasting camera may use a 4-group zoom lens as a high-quality and high-powered zoom lens.

A 4-group zoom lens includes, from an object side, a first lens group having a positive refractive power, a second lens group having a negative refractive power, a third lens group having a positive refractive power, and a fourth lens group having a positive refractive power. In the 4-group zoom lens, zooming is performed by shifting the second lens group in an optical axis direction, and focusing is performed and a variation in an image plane caused by the zooming is compensated by shifting the fourth lens group in the optical axis direction.

However, in a zoom lens having a large zoom ratio, because an angle of view is reduced at a telephoto position, significant image blur may be caused even by a small amount of camera shake. Accordingly, a photographing apparatus may include a camera shake compensating function for compensating for an image blur caused by a camera shake.

The camera shake compensating function may use an optical camera shake compensating method. This method may include a method of shifting some lenses of a lens system in a direction perpendicular to an optical axis direction, or a method using a variable vertical angle prism by varying a vertical angle of a prism disposed at a side of a lens system toward an object side.

In the variable vertical angle prism method, because a prism is disposed closer to an object side than a first lens group that is the largest lens group in a lens system, if a driving system for varying a vertical angle of the prism is also considered, the size of an object side portion of a lens barrel may be increased, and thus a compact size may not be easily achieved.

Meanwhile, in the lens shifting method, in cooperation with a detection system for detecting a camera shake, a control system for applying an amount of compensation with respect to a position of a lens based on a signal output from the detection system, and a driving system for shifting the lens in a direction perpendicular to an optical axis direction based on a signal output from the control system, an image blur caused by a camera shake occurring when, for example, a shutter release button is pressed may be compensated by shifting the lens.

Also, in the lens shifting method, an image blur may be compensated by shifting all or some lenses of a third lens group disposed adjacent to an aperture stop in a direction perpendicular to an optical axis direction. Because the third lens group is fixed in the optical axis direction, a driving system larger than a lens system in a diameter direction may be fixed in the optical axis direction, and thus the size of a whole system may be reduced.

However, an optical system using the lens shifting method has a problem in balance between obtaining a compact size and obtaining a high performance.

SUMMARY

The invention provides a compact zoom lens having a large zoom ratio and capable of achieving high optical performance by compensating a variation in an image plane caused by zooming, aberration generated when an image blur is compensated, and a photographing apparatus including the zoom lens.

According to an aspect of the invention, there is provided a zoom lens including a first lens group having a positive refractive power; a second lens group disposed in back of the first lens group, having a negative refractive power, and selectively shifteable in an optical axis direction (i.e., selectively moveable along an optical axis) to perform zooming; a third lens group disposed in back of the second lens group, having a positive refractive power, and comprising: a third-A lens group comprising a doublet lens formed by bonding a positive lens to a negative lens and having at least one aspherical surface, selectively moveable in a direction perpendicular to the optical axis direction to compensate for an image blur, and having a positive refractive power; and a third-B lens group disposed in back of the third-A lens group and comprising at least one positive lens and at least one negative lens; a fourth lens group disposed in back of the third lens group, having a positive refractive power, and selectively moveable in the optical axis direction to compensate a variation in an image plane caused by the zooming and to perform focusing; and an aperture stop disposed between the second and third lens groups.

If a focal length of the third-A lens group is $f_{3A}$, a focal length of the third-B lens group is $f_{3B}$, a focal length of the third lens group is $f_3$, and an overall focal length of the zoom lens at a telephoto position is $f_t$, the zoom lens may satisfy the following inequalities.

$$0.15 < f_{3A}/f_t < 0.35$$

$$1.2 < |f_{3B}/f_3| < 6.0$$

If the first lens group comprises at least one negative lens and at least three positive lens, the second lens group comprises at least three negative lenses and at least one positive lens, a combined focal length of the first and second lens groups at a telephoto position is $f_{12t}$, and an overall focal length of the zoom lens at the telephoto position is $f_t$, the zoom lens may satisfy the following inequality.

$$2.0 < |f_{12t}/f_t| < 4.0$$

At least one positive lens of the first lens group may have an Abbe number equal to or greater than 80.

If the fourth lens group comprises a doublet lens formed by bonding a negative lens to a positive lens disposed in back of the negative lens, a focal length of the second lens group is $f_2$, a focal length of the fourth lens group is $f_4$, an overall focal length of the zoom lens at a telephoto position is $f_t$, the zoom lens may satisfy the following inequalities.

$$0.02 < |f_2/f_t| < 0.1$$

$$0.15 < f_4/f_t < 0.3$$

According to another aspect of the invention, there is provided a photographing apparatus including a zoom lens; and a solid-state imaging device for converting an optical signal formed by the zoom lens into an electrical signal, the zoom lens including a first lens group having a positive refractive power; a second lens group disposed in back of the first lens group, having a negative refractive power, and selectively moveable in an optical axis direction (i.e., selectively moveable along the an optical axis) to perform zooming; a third lens group disposed in back of the second lens group, having a positive refractive power, and comprising: a third-A lens group comprising a doublet lens formed by bonding a positive lens to a negative lens and having at least one aspherical surface, selectively moveable in a direction perpendicular to the optical axis direction to compensate for an image blur, and having a positive refractive power; and a third-B lens group disposed in back of the third-A lens group and comprising at least one positive lens and at least one negative lens; a fourth lens group disposed in back of the third lens group, having a positive refractive power, and selectively moveable in the optical axis direction to compensate a variation in an image plane caused by the zooming and to perform focusing; and an aperture stop disposed between the second and third lens groups.

If a focal length of the third-A lens group is $f_{3A}$, a focal length of the third-B lens group is $f_{3B}$, a focal length of the third lens group is $f_3$, and an overall focal length of the zoom lens at a telephoto position is $f_t$, the zoom lens may satisfy the following inequalities.

$$0.15 < f_{3A}/f_t < 0.35$$

$$1.2 < |f_{3B}/f_3| < 6.0$$

If the first lens group comprises at least one negative lens and at least three positive lens, the second lens group comprises at least three negative lenses and at least one positive lens, a combined focal length of the first and second lens groups at a telephoto position is $f_{12t}$, and an overall focal length of the zoom lens at the telephoto position is $f_t$, the zoom lens may satisfy the following inequality.

$$2.0 < |f_{12t}/f_t| < 4.0$$

At least one positive lens of the first lens group may have an Abbe number equal to or greater than 80.

If the fourth lens group comprises a doublet lens formed by bonding a negative lens to a positive lens disposed in back of the negative lens, a focal length of the second lens group is $f_2$, a focal length of the fourth lens group is $f_4$, an overall focal length of the zoom lens at a telephoto position is $f_t$, the zoom lens may satisfy the following inequalities.

$$0.02 < |f_2/f_t| < 0.1$$

$$0.15 < f_4/f_t < 0.3$$

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
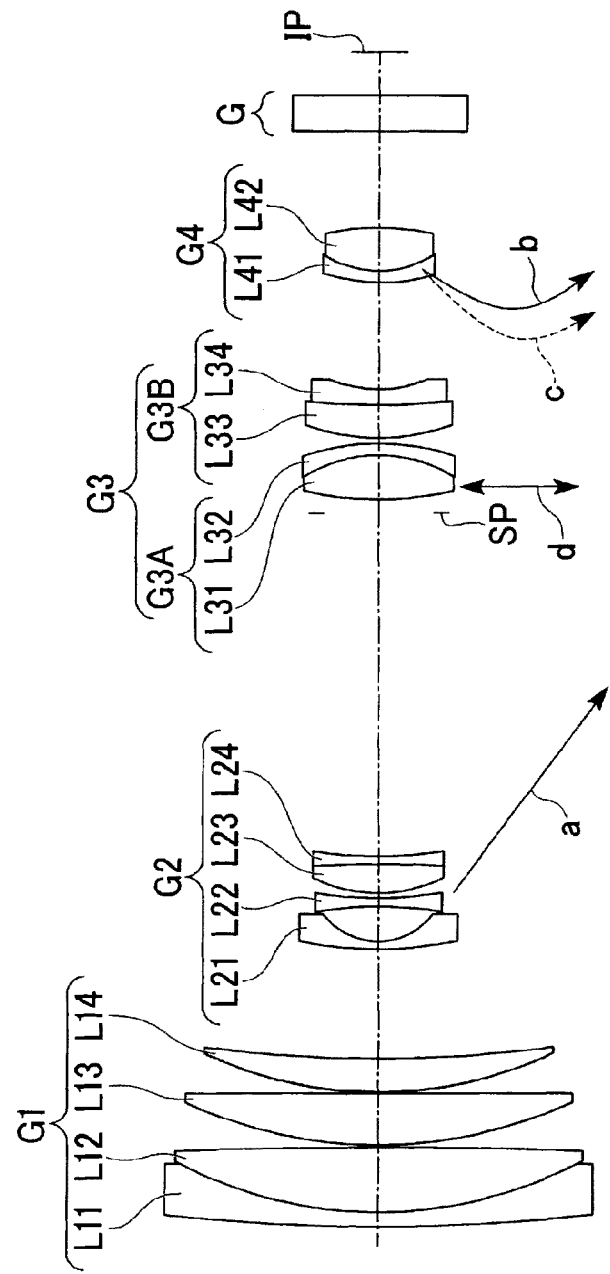
FIG. 1 is a conceptual view showing components of a zoom lens according to an embodiment of the invention.

Reference will now be made in detail to embodiments of a zoom lens and a photographing apparatus having the same, examples of which are illustrated in the accompanying drawings, wherein like reference numerals refer to like elements throughout, and the size of each component may be exaggerated for clarity. In this regard, the present embodiments may have different forms and should not be construed as being limited to the descriptions set forth herein. In the following description, a front side of a zoom lens is an object side, which is the end of zoom lens furthest from a camera body including the zoom lens or to which the zoom lens is coupled.

FIG. 1 is a conceptual view showing components of a zoom lens according to an embodiment of the invention.

Referring to FIG. 1, the zoom lens includes a first lens group G1 having a positive refractive power disposed closest to the object side of the zoom lens, a second lens group G2 disposed in back of the first lens group G1 (i.e., further away from the object side) and having a negative refractive power, a third lens group G3 disposed in back of the second lens group G2 and having a positive refractive power, a fourth lens group G4 disposed in back of the third lens group G3 and having a positive refractive power, and an aperture stop SP disposed between the second and third lens groups G2 and G3. An optical block G is disposed between the fourth lens group G4 and an image plane IP.

With respect to the first and third lens groups G1 and G3, which have fixed locations along an optical axis, zooming is performed by shifting the second lens group G2 in an optical axis direction (i.e., along the optical axis), and focusing is performed by shifting the fourth lens group G4 in the optical axis direction. When zooming is performed from a wide angle position to a telephoto position, a variation in the image plane IP caused by the zooming is compensated by shifting the second lens group G2 toward the image plane IP in a direction indicated by an arrow a and simultaneously shifting the fourth lens group G4 along a convex track toward and then away from the object side in a direction indicated by an arrow b or c.

The arrow b represented by a solid line and the arrow c represented by a dashed line respectively represent shift tracks for compensating for a variation in the image plane IP caused by zooming when focusing is performed on (i) an object at an infinite location and (ii) an object at a close location. If the fourth lens group G4 is shifted along the convex track b or c toward and then away from the object side as described above, a space between the third and fourth lens groups G3 and G4 may be used, and thus a total length of the zoom lens may be reduced.

The third lens group G3 includes a third-A lens group G3A having a positive refractive power, and a third-B lens group G3B disposed in back of the third-A lens group G3A and having a negative refractive power. If the third-A lens group G3A is shifted in a direction perpendicular to the optical axis direction as indicated by an arrow d, an image formed on the image plane IP is shifted, and thus, for example, an image blur caused by a camera shake may be compensated.

The first lens group G1 includes at least one negative lens and at least three positive lenses. In the current embodiment, the first lens group G1 includes a doublet lens formed by bonding a negative lens L11 having a convex surface toward the object side and having a meniscus shape to a positive lens L12 having a convex surface toward the object side, and two positive lenses L13 and L14 having convex surfaces toward the object side. In the current embodiment, because the first lens group G1 includes the four lenses L11, L12, L13, and L14, spherical aberration is well compensated even at a relatively large zoom ratio. Also, if at least one the two positive lenses L12 and L13 included in the first lens group G1 has an Abbe number $V_d$ equal to or greater than 80, particularly, axial chromatic aberration and lateral chromatic aberration at a telephoto position may be easily compensated.

A zoom lens having a large zoom ratio is not able to easily compensate for spherical aberration at, in particular, a telephoto position. Also, a compact and high-powered zoom lens may have a large amount of aberration while shifting a lens group. In order to solve these problems, the zoom lens according to the current embodiment includes the first lens group G1 having the negative lens L11, the positive lens L12 disposed in back of the negative lens L11, and the two positive lenses L13 and L14 disposed in back of the positive lens L12 and having convex surfaces toward the object side, and, thus, may easily compensate for spherical aberration at a telephoto position by dispersing the positive refractive power of the first lens group G1.

The second lens group G2 includes at least three negative lenses and at least one positive lens. In the current embodiment, the second lens group G2 includes two negative lenses L21 and L22, and a doublet lens formed by bonding a positive lens L23 disposed in back of the negative lens L21 and L22 and having a convex surface toward the object side, to a negative lens L24. As such, the negative refractive power of the second lens group G2 is dispersed and comma aberration generated due to a variation in angle of view at a wide angle position is compensated, thereby achieving high performance. Also, if the doublet lens formed by bonding the positive lens L23 to the negative lens L24 is used, a bonding error in a manufacturing process may be reduced and aberration such as chromatic aberration may be compensated, and thus a stable optical quality may be achieved.

The third lens group G3 includes the third-A lens group G3A including a doublet lens formed by bonding a positive lens L31 to a negative lens L32 disposed in back of the positive lens L31. As such, chromatic aberration generated when an image blur is compensated may be compensated. The third-A lens group G3A to be shifted in the direction perpendicular to the optical axis direction may have a simple structure due to the doublet lens, and thus a compact size of the zoom lens may be easily achieved. Also, at least one surface of the doublet lens is formed as an aspherical surface. In the current embodiment, a surface of the positive lens L31 toward the object side is formed as an aspherical surface. As such, paraxial aberration generated when zooming is performed and an image blur is compensated may also be compensated.

The third lens group G3 includes the third-B lens group G3B including at least one positive lens and at least one negative lens. In the current embodiment, the third-B lens group G3B includes a doublet lens formed by bonding a positive lens L33 to a negative lens L34 disposed in back of the positive lens L33. As such, chromatic aberration and paraxial aberration generated when an image blur is compensated may be easily compensated. Also, if the positive lens L33 and the negative lens L34 are formed as a doublet lens, the third-B lens group G3B may have a simple structure, and thus a compact size of the zoom lens may be easily achieved.

Also, although the third-B lens group G3B includes the positive lens L33 and the negative lens L34 in the current embodiment, the third-B lens group G3B may further include another positive lens or another negative lens. In this case, although the zoom lens may not have as compact a size, aberration may be compensated better, and thus optical performance may be improved.

Furthermore, although the third-B lens group G3B includes the positive lens L33 and the negative lens L34 disposed in back of the positive lens L33 in the current embodiment, the third-B lens group G3B may include the negative lens L34 and the positive lens L33 disposed in back of the negative lens L34. In this case, because light incident on the third-B lens group G3B diverges due to the negative lens L34 and then converges due to the positive lens L33, although lens diameters of the third-B lens group G3B are increased, aberration may also be compensated as in the current embodiment.

The fourth lens group G4 includes a doublet lens formed by bonding a negative lens L41 to a positive lens L42 disposed in back of the negative lens L41. As such, the zoom lens according to the current embodiment may compensate for axial aberration generated when zooming is performed. Also, if the negative lens L41 and the positive lens L42 are formed as a doublet lens, when focusing is performed, because the fourth lens group G4 to be shifted in the optical axis direction has a simple structure and a light weight, focusing may be performed rapidly. Spherical aberration generated in the fourth lens group G4 may be easily compensated by forming at least one surface of the doublet lens as an aspherical surface. In the current embodiment, a surface of the positive lens L42 toward the image plane IP is formed as an aspherical surface.

The aperture stop SP is disposed at a side of the third lens group G3 toward the object side and is fixed in the optical axis direction. As such, a driving torque of an actuator driven when zooming is performed may be set to be small, and thus power consumption may be reduced. Also, if the aperture stop SP is disposed at the side of the third lens group G3 toward the object side, an upper part of an entrance pupil may be close to the object side, and thus a diameter of a whole lens system may be reduced.

The optical block G may be an optical filter, a face plate, a low pass filter (LPF), an infrared cut filter, or the like.

The zoom lens according to the current embodiment is not limited to the above descriptions and may be appropriately changed without departing from the scope of the invention. For example, a lens group having a refractive power or a converter lens group may be disposed at a side of the first lens group G1 toward the object side.

If a focal length of the third-A lens group G3A is $f_{3A}$, a focal length of the third-B lens group G3B is $f_{3B}$, a focal length of the third lens group G3 is $f_3$, and an overall focal length of the zoom lens at a telephoto position is $f_t$, the zoom lens according to the current embodiment may satisfy Inequalities 1 and 2.

$$0.15 < f_{3A}/f_t < 0.35 \qquad \text{Inequality 1}$$

$$1.2 < |f_{3B}/f_3| < 6.0 \qquad \text{Inequality 2}$$

In Inequality 1, if $f_{3A}/f_t$ is equal to or less than 0.15, the positive refractive power of the third-A lens group G3A may be excessively strong, control of compensation for an image blur may be complicated, and thus an image blur may not be completely compensated. Otherwise, if $f_{3A}/f_t$ is equal to or greater than 0.35, the positive refractive power of the third-A lens group G3A may be excessively weak, a shift amount of the third-A lens group G3A when an image blur is compensated may be increased, and a compact size of a driving system may not be easily achieved due to a large driving amount.

In Inequality 2, if $|f_{3B}/f_3|$ is equal to or less than 1.2, because the negative refractive power of the third-B lens group G3B may be strong, an eccentric sensitivity may be excessively strong, and a stable and high optical performance may not be easily ensured if a manufacturing error is present. Also, if the positive refractive power of the third-B lens group G3B is excessively weak, a compact size may not be easily achieved. Meanwhile, in Inequality 2, if $|f_{3B}/f_3|$ is equal to or greater than 6.0, the negative refractive power of the third-B lens group G3B may be excessively weak, an effect of dividing the third lens group G3 into the third-A lens group G3A and the third-B lens group G3B may be reduced, and thus the eccentric sensitivity may not be strong. Furthermore, if the positive refractive power of the third lens group G3 is excessively strong, a convergence effect may be strong and a variation in comma aberration caused by a variation in angle of view may not be easily compensated.

Also, the zoom lens according to the current embodiment may further satisfy Inequalities 1' and 2'.

$$0.23 < f_{3A}/f_t < 0.3 \qquad \text{Inequality 1'}$$

$$3.0 < |f_{3B}/f_3| < 4.5 \qquad \text{Inequality 2'}$$

If a combined focal length of the first and second lens groups G1 and G2 at a telephoto position is $f_{12t}$, the zoom lens according to the current embodiment may satisfy Inequality 3.

$$2.0 < |f_{12t}/f_t| < 4.0 \qquad \text{Inequality 3}$$

In Inequality 3, if $|f_{12t}/f_t|$ is equal to or less than 2.0, a combined refractive power of the first and second lens groups G1 and G2 may be excessively strong, aberration may not be easily compensated, and thus a high performance may not be achieved. Otherwise, if $|f_{12t}/f_t|$ is equal to or greater than 4.0, the combined refractive power of the first and second lens groups G1 and G2 may be excessively weak, lens diameters of the first lens group G1 may be increased, and thus a compact size may not be easily achieved.

Also, the zoom lens according to the current embodiment may further satisfy Inequality 3'.

$$2.5 < |f_{12t}/f_t| < 3.5 \qquad \text{Inequality 3'}$$

If a focal length of the second lens group G2 is $f_2$ and a focal length of the fourth lens group G4 is $f_4$, the zoom lens according to the current embodiment may satisfy Inequalities 4 and 5.

$$0.02 < |f_2/f_t| < 0.1 \qquad \text{Inequality 4}$$

$$0.15 < f_4/f_t < 0.3 \qquad \text{Inequality 5}$$

In Inequality 4, if $|f_2/f_t|$ is equal to or less than 0.02, the negative refractive power of the second lens group G2 may be excessively strong and a variation in aberration when zooming is performed from a wide angle position to a telephoto position may not be easily compensated. Otherwise, if $|f_2/f_t|$ is equal to or greater than 0.1, the negative refractive power of the second lens group G2 may be excessively weak, a shift amount of the second lens group G2 when zooming is performed may be increased, the total length of the zoom lens may be increased, and thus a compact size of the zoom lens may not be easily achieved.

In Inequality 5, if $f_4/f_t$ is equal to or less than 0.15, the positive refractive power of the fourth lens group G4 may be excessively strong and a variation in aberration when zooming is performed from a wide angle position to a telephoto position may not be easily compensated. Otherwise, if $f_4/f_t$ is equal to or greater than 0.3, the positive refractive power of the fourth lens group G4 may be excessively weak, a shift amount of the fourth lens group G4 when focusing is performed may be increased, a distance between the third and fourth lens groups G3 and G4 may not be reduced, and thus a compact size of the zoom lens may not be easily achieved.

Also, the zoom lens according to the current embodiment may further satisfy Inequalities 4' and 5'.

$$0.04 < |f_2/f_t| < 0.08 \qquad \text{Inequality 4'}$$

$$0.15 < f_4/f_t < 0.2 \qquad \text{Inequality 5'}$$

The zoom lens according to the current embodiment, by satisfying the above conditions (i.e., inequalities), may have a large zoom ratio (for example, about 30), may well compensate a variation in the image plane IP caused by zooming and aberration generated when an image blur is compensated, may achieve high optical performance from a wide angle position to a telephoto position, and may have a small total length and a compact size.

That is, the invention provides a compact zoom lens capable of well compensating spherical aberration, comma aberration, field curvature, axial chromatic aberration, and lateral chromatic aberration, and maintaining high optical performance even when a camera shake is compensated.

Also, because a compact zoom lens having a large zoom ratio and high optical performance may be used as an optical imaging system of a photographing apparatus such as a security camera, a digital video camera, or a digital still camera, a compact photographing apparatus having a large zoom ratio and high optical performance, and capable of compensating for a camera shake may be provided.

In a photographing apparatus including the zoom lens according to the current embodiment, light incident on the zoom lens from the object side reaches the image plane IP. If the photographing apparatus includes a solid-state imaging device such as a charge coupled device (CCD) or a complementary metal-oxide-semiconductor (CMOS) sensor, the light incident from the object side forms an image on an image forming surface of the imaging device at the image plane IP. The imaging device converts an optical signal formed by the zoom lens into an electrical signal, generates a digital image corresponding to the image from the electrical signal, and stores the digital image in a recording medium such as a hard disk drive (HDD), a memory card, an optical disk, or magnetic tape. Furthermore, if the photographing apparatus is a film camera, the image plane IP corresponds to a film surface.

Various embodiments of the zoom lens will now be described in detail to clarify the benefits of the invention. However, the invention is not limited to the following embodiments and may be appropriately changed without departing from the scope of the invention.

Embodiment 1

Figure 2:
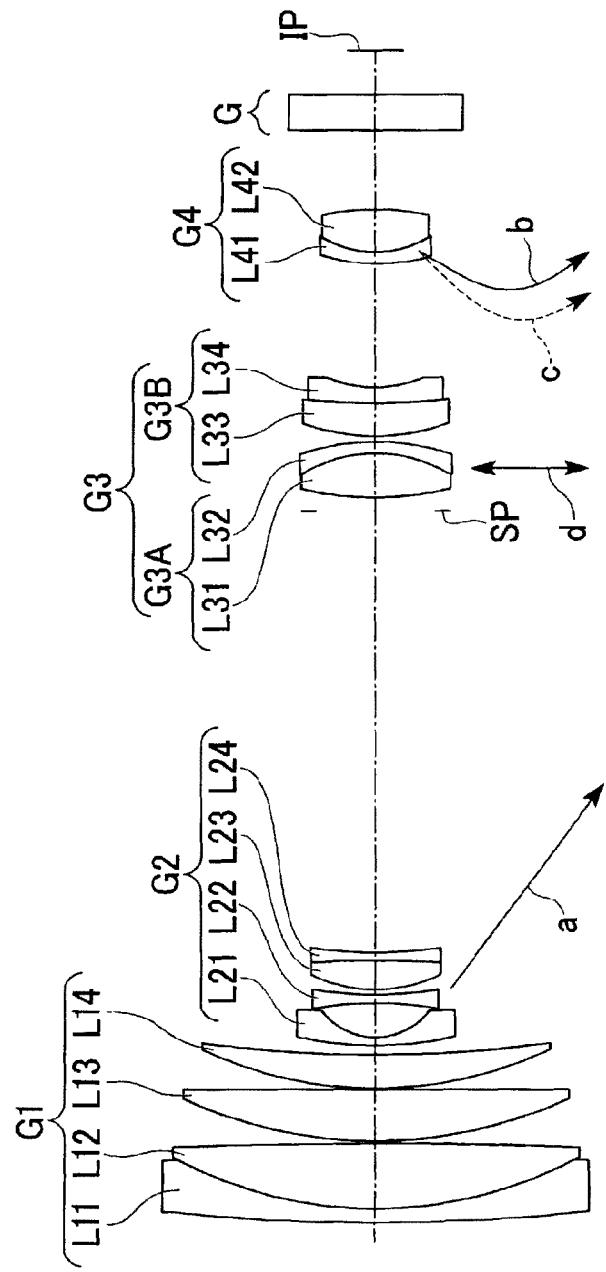
FIG. 2 is a conceptual view showing components of a zoom lens according to another embodiment of the invention.

FIG. 2 is a conceptual view showing components of a zoom lens according to another embodiment of the invention.

Referring to FIG. 2, a structure of a zoom lens based on design data shown in Tables 1, 1A, 1B and 1C is illustrated. The zoom lens illustrated in FIG. 2 has the same structure as that of the zoom lens illustrated in FIG. 1.

TABLE 1

| Surface No. | Lens | R | D | Nd | $V_d$ |
|---|---|---|---|---|---|
| 1 | G1R1 | 133.990 | 0.880 | 1.83400 | 37.35 |
| 2 | G1R2/G2R1 | 26.772 | 4.240 | 1.49700 | 81.61 |
| 3 | G2R2 | −262.783 | 0.150 | | |
| 4 | G3R1 | 29.564 | 3.230 | 1.49700 | 81.61 |
| 5 | G3R2 | 1561.400 | 0.150 | | |
| 6 | G4R1 | 27.424 | 2.140 | 1.63850 | 55.45 |
| 7 | G4R2 | 77.740 | Variable 1 | | |
| 8 | G5R1 | 24.102 | 0.500 | 1.88300 | 40.81 |
| 9 | G5R2 | 4.406 | 2.225 | | |
| 10 | G6R1 | −20.820 | 0.500 | 1.88300 | 40.81 |
| 11 | G6R2 | 20.820 | 0.322 | | |
| 12 | G7R1 | 9.176 | 1.780 | 19.2286 | 20.88 |
| 13 | G7R2/G8R1 | −167.420 | 0.600 | 1.88300 | 40.81 |
| 14 | G8R2 | 24.198 | Variable 2 | | |
| 15 | Aperture Stop | ∞ | 0.850 | | |
| 16 | G9R1 | 20.760 | 2.840 | 1.58913 | 61.15 |
| 17 | G9R2/G10R1 | −9.376 | 0.690 | 1.84666 | 23.78 |
| 18 | G10R2 | −16.777 | 0.400 | | |
| 19 | G11R1 | 14.589 | 2.100 | 1.84666 | 23.78 |
| 20 | G12R2/G13R1 | 49.726 | 1.000 | 1.88300 | 40.81 |

TABLE 1-continued

| Surface No. | Lens | R | D | Nd | $V_d$ |
|---|---|---|---|---|---|
| 21 | G13R2 | 11.073 | Variable 3 | | |
| 22 | G14R1 | 10.121 | 0.850 | 1.92286 | 20.88 |
| 23 | G14R2/G15R1 | 6.340 | 2.690 | 1.58913 | 61.15 |
| 24 | G15R2 | −18.345 | Variable 4 | | |
| 25 | Flat Surface | ∞ | 2.250 | 1.58633 | 64.14 |
| 26 | Flat Surface | ∞ | 2.780 | | |

TABLE 1A

| Zoom Ratio = 28.26 | Wide Angle Position | Intermediate Position | Telephoto Position |
|---|---|---|---|
| Focal Length | 2.7403 | 11.7772 | 77.4455 |
| Fno | 1.84 | 2.55 | 3.84 |
| Half Angle of View (°) | 30.98 | 7.95 | 1.22 |
| Image Height | 1.6450 | 1.6450 | 1.6450 |
| Total Length of Lens | 74.5812 | 74.5812 | 74.5812 |
| BF | 9.3208 | 13.2750 | 8.6908 |
| Variable 1 | 0.6000 | 17.0875 | 27.2532 |
| Variable 2 | 27.9768 | 11.4893 | 1.3236 |
| Variable 3 | 7.7731 | 3.8362 | 8.4104 |
| Variable 4 | 5.0649 | 9.0019 | 4.4276 |

TABLE 1B

| Inequality | Value |
|---|---|
| (1) $f_{3A}/f_t$ | 0.258 |
| (2) $|f_{3B}/f_3|$ | 3.393 |
| (3) $|f_{12}/f_t|$ | 2.805 |
| (4) $|f_2/f_t|$ | 0.069 |
| (5) $f_4/f_t$ | 0.187 |

TABLE 1C

| | Surface No. | |
|---|---|---|
| | 16 | 24 |
| R | 20.760 | −18.345 |
| K | 0 | 0 |
| $A_4$ | −6.04E−05 | 9.71E−05 |
| $A_6$ | −6.13E−07 | −8.87E−06 |
| $A_8$ | 2.82E−08 | 4.95E−07 |
| $A_{10}$ | 0.00E+00 | 0.00E+00 |

In Table 1, the column "Surface No." i, where i is a positive integer, identifies lens surfaces of the lenses included in the zoom lens, which are sequentially numbered from the object side toward the image plane IP. That is, the lens surface of the lens L11 facing the object size is lens surface i=1.

In the column "Lens" GjRk, where j is a positive integer, and k is 1 or 2, G identifies lenses included in the zoom lens, which are sequentially numbered from the object side toward the image plane IP, and R identifies a lens surface of each lens with the object side as 1 and image plane size as 2. Data regarding "Aperture Stop" and "Optical Block (Flat Surface)" are also shown in Table 1.

The column R represents a curvature radius (mm) of the corresponding lens surface, where ∞ represents a flat surface.

The column D represents a distance (mm) between ith and (i+1)th lens surfaces from the object side, and a variable distance (mm) at a wide angle position, an intermediate position, and a telephoto position are separately shown in Table 1A.

The column Nd represents a refractive index of each lens.

The column $V_d$ represents the Abbe number of each lens.

A zoom ratio, and F Number (Fno), Half Angle of View ω (°), Image Height (mm), Total Length of Lens (mm), and Back Focal Length BF (mm) at a wide angle position, an intermediate position, and a telephoto position are shown in Table 1A. The BF represents a distance from a final lens surface to a paraxial image plane. The Total Length of Lens represents a sum of the BF and a distance from an initial lens surface to the final lens surface.

Inequalities such as (1) $f_{3A}/f_t$, (2) $|f_{3B}/f_3|$, (3) $|f_{12}/f_t|$, (4) $|f_2/f_t|$, and (5) $f_4/f_t$ are shown in Table 1B.

Surface numbers of aspherical surfaces of lenses and their aspherical surface coefficients are shown in Table 1C. An aspherical surface may be represented as a displacement in an optical axis direction at a location of a height H from an optical axis with reference to a vertex of a surface as shown below in Equation 6, where R represents a curvature radius, K represents a conic constant, and $A_4$, $A_6$, $A_8$, and $A_{10}$ represent aspherical surface coefficients. In the aspherical surface coefficients, $E^{-m}$ represents×$10^{-m}$, where m is an integer.

$$X = \frac{(1/R)H^2}{1 + \sqrt{1 - (1+K)(H/R)^2}} + A4H^4 + A6H^6 + A8H^8 + A10H^{10}$$ (Equation 6)

Figure 3:
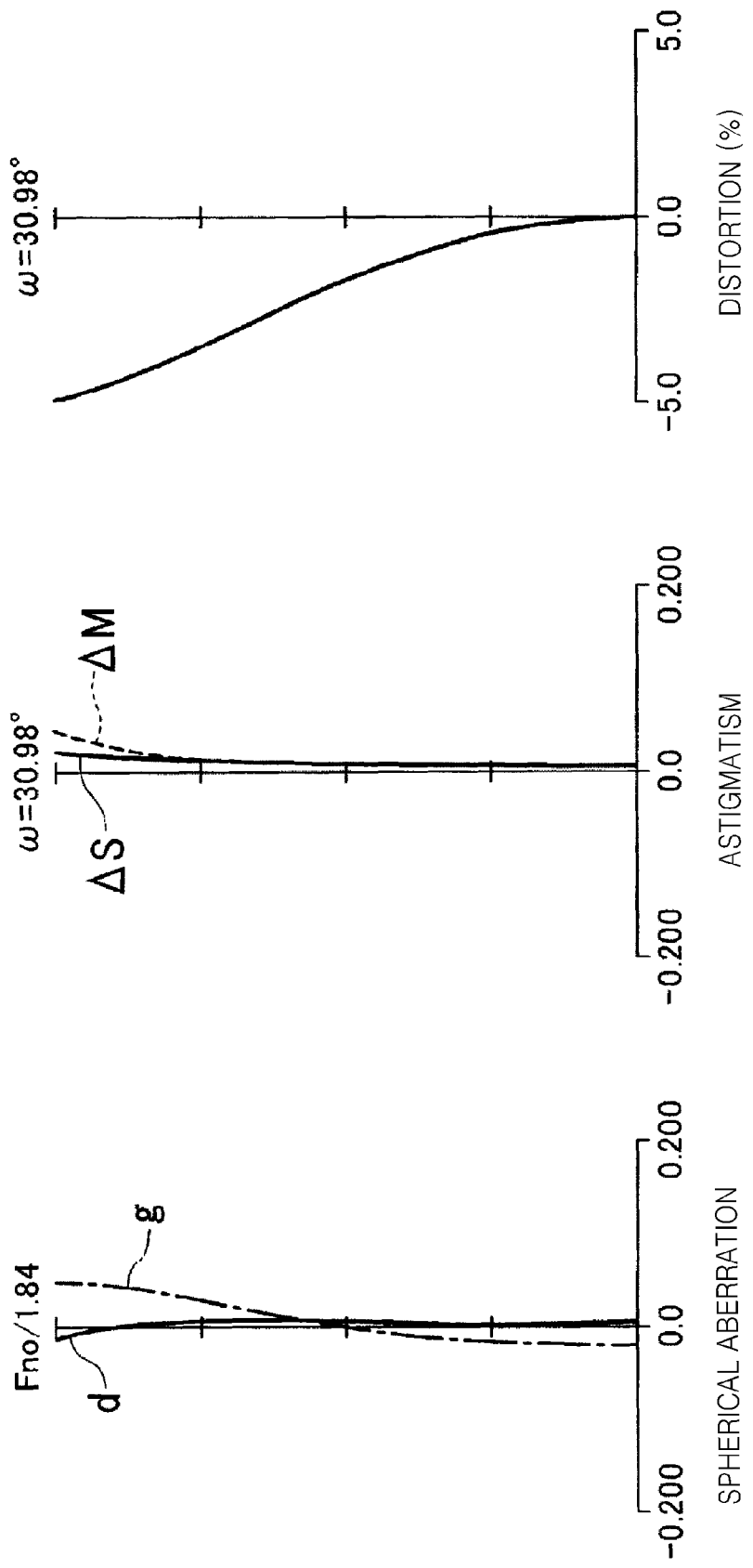
FIG. 3 illustrates graphs showing spherical aberration, astigmatism, and distortion at a wide angle position of the zoom lens according to the embodiment of FIG. 2.
Figure 4:
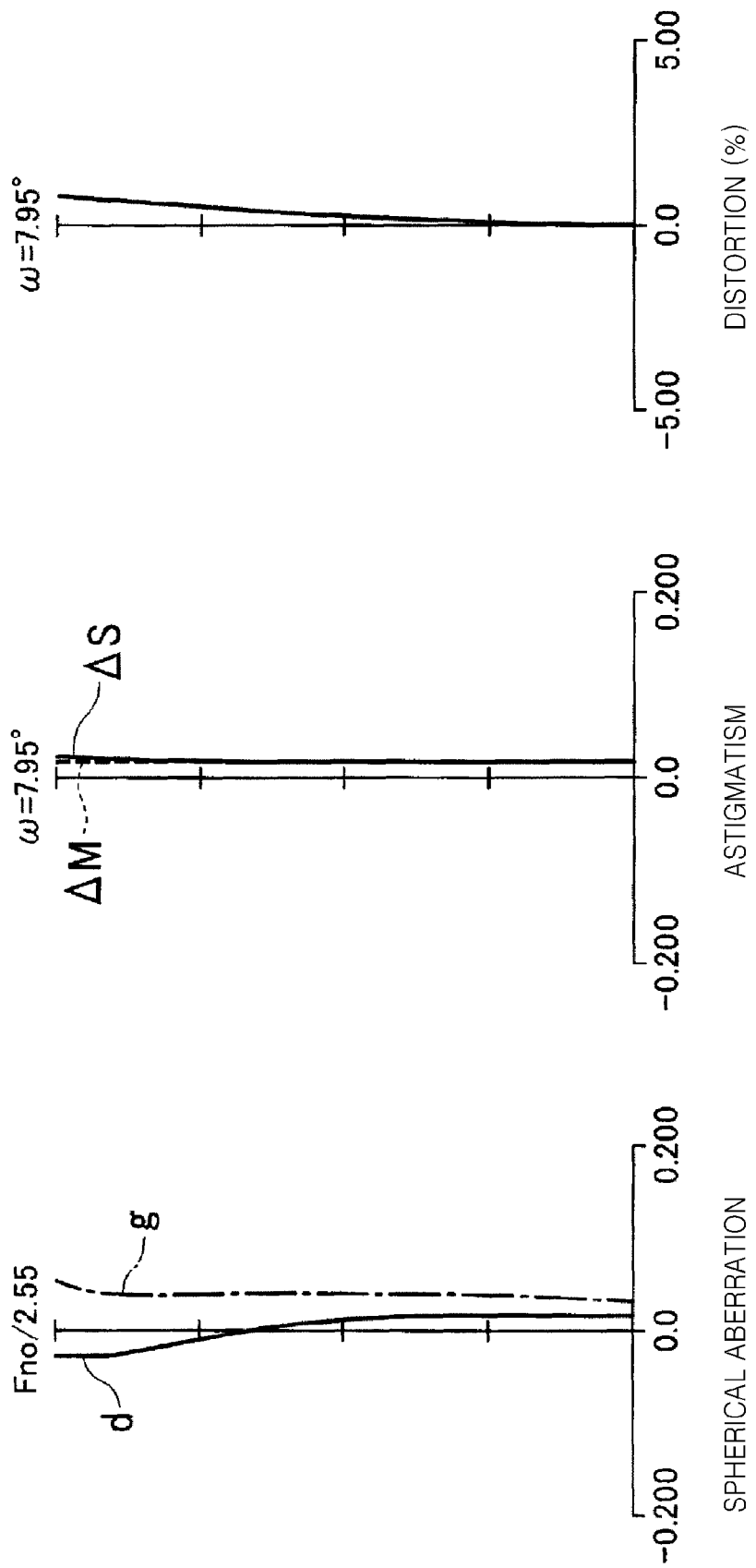
FIG. 4 illustrates graphs showing spherical aberration, astigmatism, and distortion at an intermediate position of the zoom lens according to the embodiment of FIG. 2.
Figure 5:
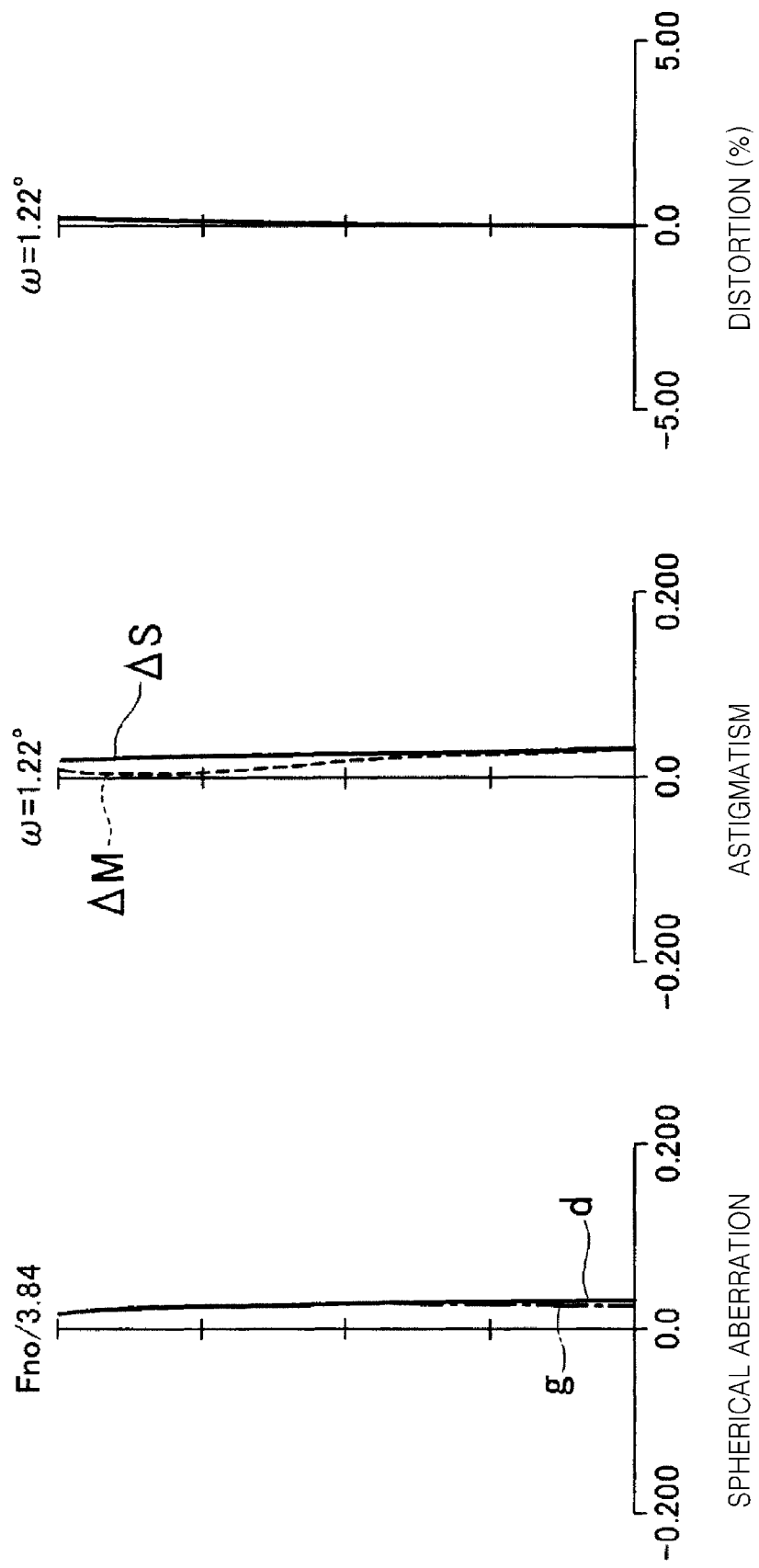
FIG. 5 illustrates graphs showing spherical aberration, astigmatism, and distortion at a telephoto position of the zoom lens according to the embodiment of FIG. 2.

FIG. 3 illustrates graphs showing spherical aberration, astigmatism, and distortion at a wide angle position of the zoom lens according to the current embodiment. FIG. 4 illustrates graphs showing spherical aberration, astigmatism, and distortion at an intermediate position of the zoom lens according to the current embodiment. FIG. 5 illustrates graphs showing spherical aberration, astigmatism, and distortion at a telephoto position of the zoom lens according to the current embodiment.

The spherical aberration graphs show line d (wavelength 587.56 nm) spherical aberration using a solid line, and show line g (wavelength 435.835 nm) spherical aberration using a dashed line.

The astigmatism graphs show astigmatism of a sagittal surface ΔS and a meridional surface ΔM of each wavelength.

The distortion graphs show distortion of line d (wavelength 587.56 nm).

The zoom lens according to the current embodiment satisfies the conditions of Inequalities 1 to 5 and 1' to 5' as shown in Table 1B. The zoom lens according to the current embodiment well compensates each type of aberration as illustrated in FIGS. 3 through 5.

Embodiment 2

Figure 6:
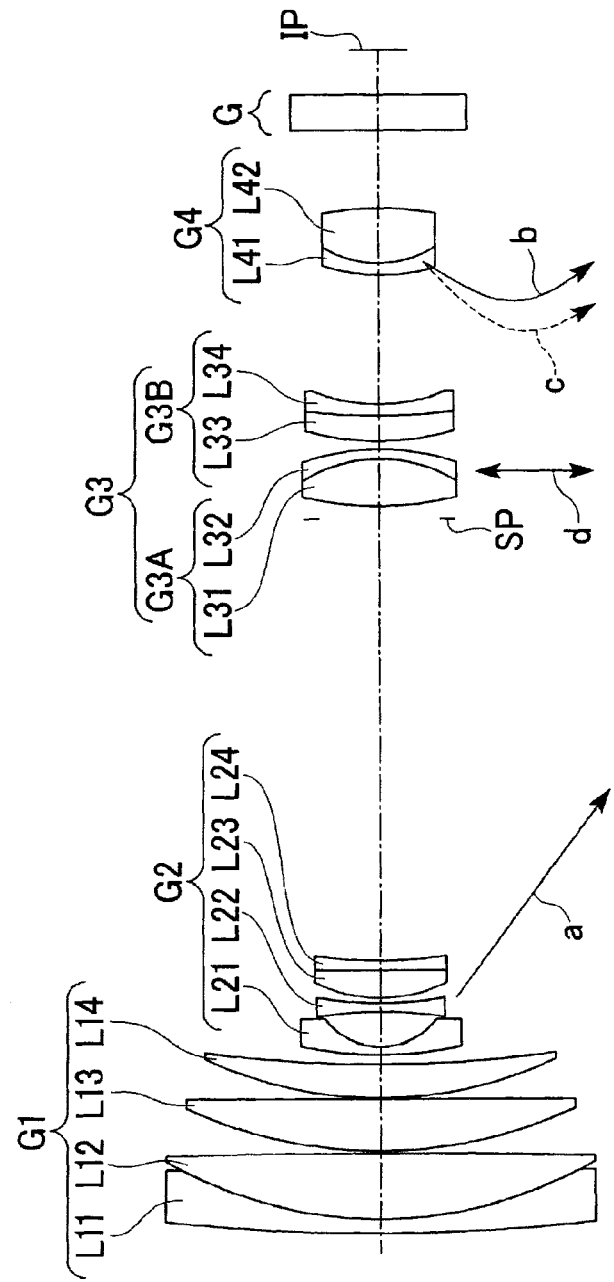
FIG. 6 is a conceptual view showing components of a zoom lens according to yet another embodiment of the invention.

FIG. 6 is a conceptual view showing components of a zoom lens according to yet another embodiment of the invention.

Referring to FIG. 6, a structure of a zoom lens based on design data of Tables 2, 2A, 2B and 2C is illustrated. The zoom lens illustrated in FIG. 6 has the same structure as that of the zoom lens illustrated in FIG. 1. Descriptions on reference numerals in Tables 2, 2A, 2B and 2C are identical to those provided above in connection with Tables 1, 1A, 1B and 1C.

TABLE 2

| Surface No. | Lens | R | D | Nd | $V_d$ |
|---|---|---|---|---|---|
| 1 | G1R1 | 117.548 | 0.880 | 1.83400 | 37.35 |
| 2 | G1R2/G2R1 | 26.024 | 4.240 | 1.49700 | 81.61 |
| 3 | G2R2 | −406.800 | 0.150 | | |
| 4 | G3R1 | 29.113 | 3.290 | 1.49700 | 81.61 |
| 5 | G3R2 | 2504.088 | 0.150 | | |
| 6 | G4R1 | 27.330 | 2.130 | 1.63850 | 55.45 |
| 7 | G4R2 | 76.244 | Variable 1 | | |
| 8 | G5R1 | 23.901 | 0.500 | 1.88300 | 40.81 |
| 9 | G5R2 | 4.326 | 2.222 | | |
| 10 | G6R1 | −19.972 | 0.500 | 1.88300 | 40.81 |
| 11 | G6R2 | 19.972 | 0.194 | | |
| 12 | G7R1 | 8.940 | 1.790 | 19.2286 | 20.88 |
| 13 | G7R2/G8R1 | −107.860 | 0.600 | 1.88300 | 40.81 |
| 14 | G8R2 | 25.600 | Variable 2 | | |
| 15 | Aperture Stop | ∞ | 0.850 | | |
| 16 | G9R1 | 18.576 | 2.940 | 1.58913 | 61.15 |
| 17 | G9R2/G10R1 | −9.230 | 0.690 | 1.84666 | 23.78 |
| 18 | G10R2 | −15.749 | 0.400 | | |
| 19 | G11R1 | 16.617 | 1.700 | 1.84666 | 23.78 |
| 20 | G12R2/G13R1 | 92.000 | 0.680 | 1.88300 | 40.81 |
| 21 | G13R2 | 12.311 | Variable 3 | | |
| 22 | G14R1 | 10.855 | 0.850 | 1.92286 | 20.88 |
| 23 | G14R2/G15R1 | 6.690 | 3.380 | 1.58913 | 61.15 |
| 24 | G15R2 | −18.212 | Variable 4 | | |
| 25 | Flat Surface | ∞ | 2.250 | 1.58633 | 64.14 |
| 26 | Flat Surface | ∞ | 2.780 | | |

TABLE 2A

| Zoom Ratio = 28.26 | Wide Angle Position | Intermediate Position | Telephoto Position |
|---|---|---|---|
| Focal Length | 2.7401 | 11.7763 | 77.4236 |
| Fno | 1.83 | 2.53 | 3.85 |
| Half Angle of View (°) | 30.98 | 7.95 | 1.22 |
| Image Height | 1.6450 | 1.6450 | 1.6450 |
| Total Length of Lens | 74.4422 | 74.4422 | 74.4422 |
| BF | 9.0317 | 13.1748 | 8.7909 |
| Variable 1 | 0.6000 | 17.0569 | 27.1008 |
| Variable 2 | 27.8199 | 11.3630 | 1.3192 |
| Variable 3 | 8.1082 | 3.9937 | 8.3451 |
| Variable 4 | 4.7777 | 8.8923 | 4.5407 |

TABLE 2B

| Inequality | Value |
|---|---|
| (1) $f_{3A}/f_t$ | 0.231 |
| (2) $|f_{3B}/f_3|$ | 3.000 |
| (3) $|f_{12}/f_t|$ | 2.588 |
| (4) $|f_2/f_t|$ | 0.067 |
| (5) $f_4/f_t$ | 0.197 |

TABLE 2C

| Surface No. | 16 | 24 |
|---|---|---|
| R | 18.576 | −18.212 |
| K | 0 | 0 |
| $A_4$ | −8.50E−05 | 8.77E−05 |
| $A_6$ | −5.31E−07 | −8.26E−06 |
| $A_8$ | 2.66E−08 | 4.77E−07 |
| $A_{10}$ | 0.00E+00 | 0.00E+00 |

Figure 7:
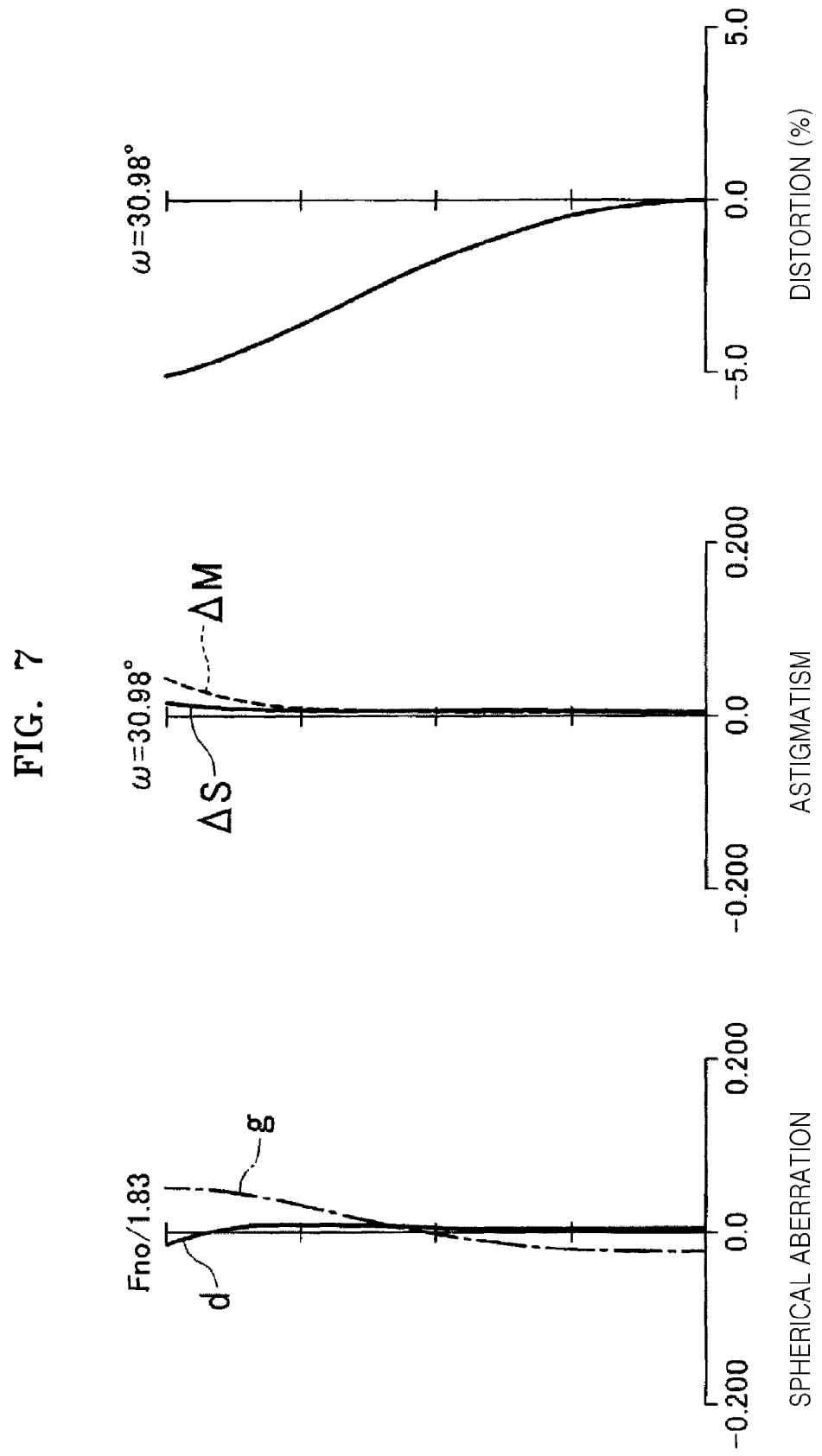
FIG. 7 illustrates graphs showing spherical aberration, astigmatism, and distortion at a wide angle position of the zoom lens according to the embodiment of FIG. 6.
Figure 8:
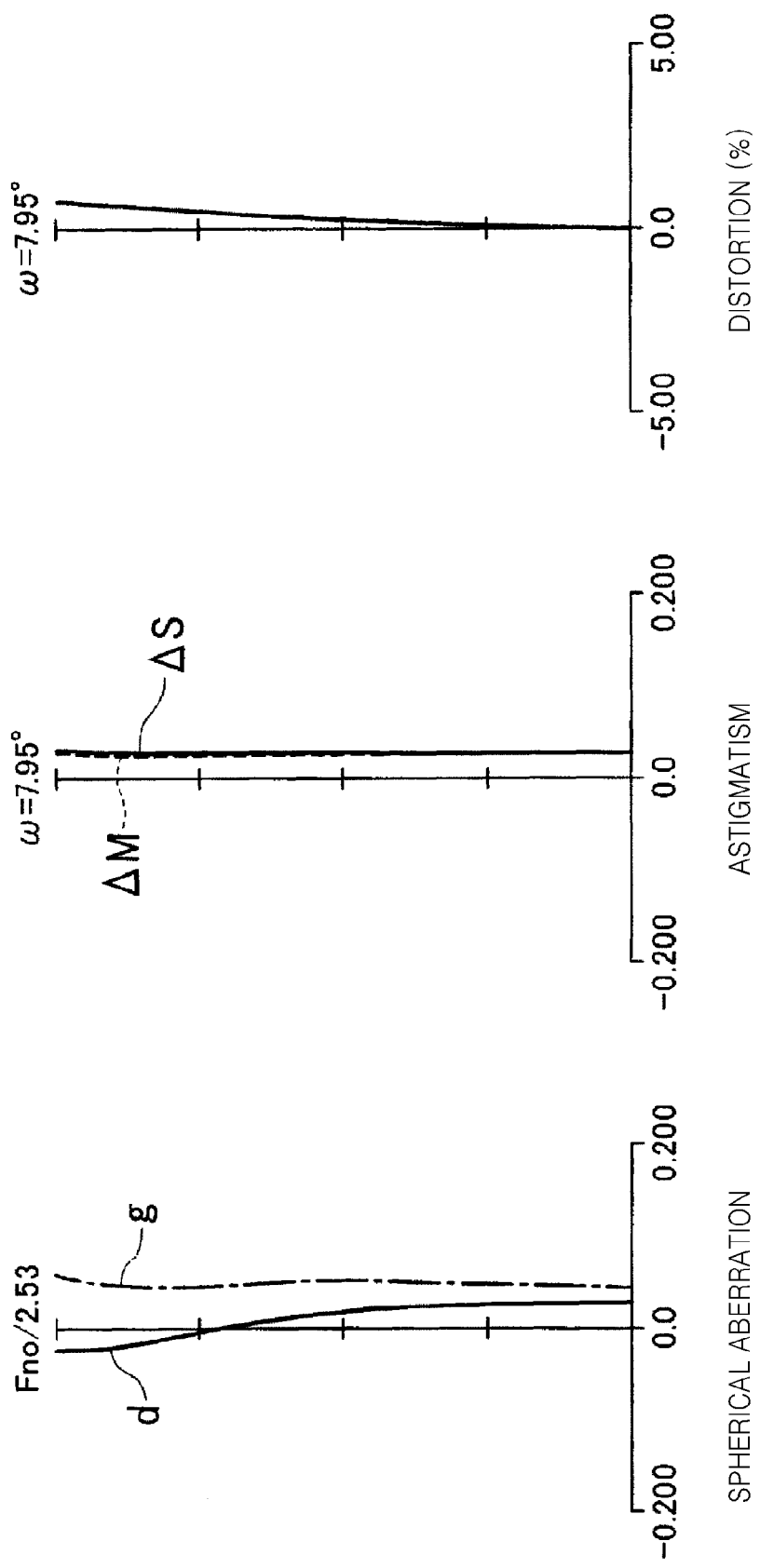
FIG. 8 illustrates graphs showing spherical aberration, astigmatism, and distortion at an intermediate position of the zoom lens according to the embodiment of FIG. 6.
Figure 9:
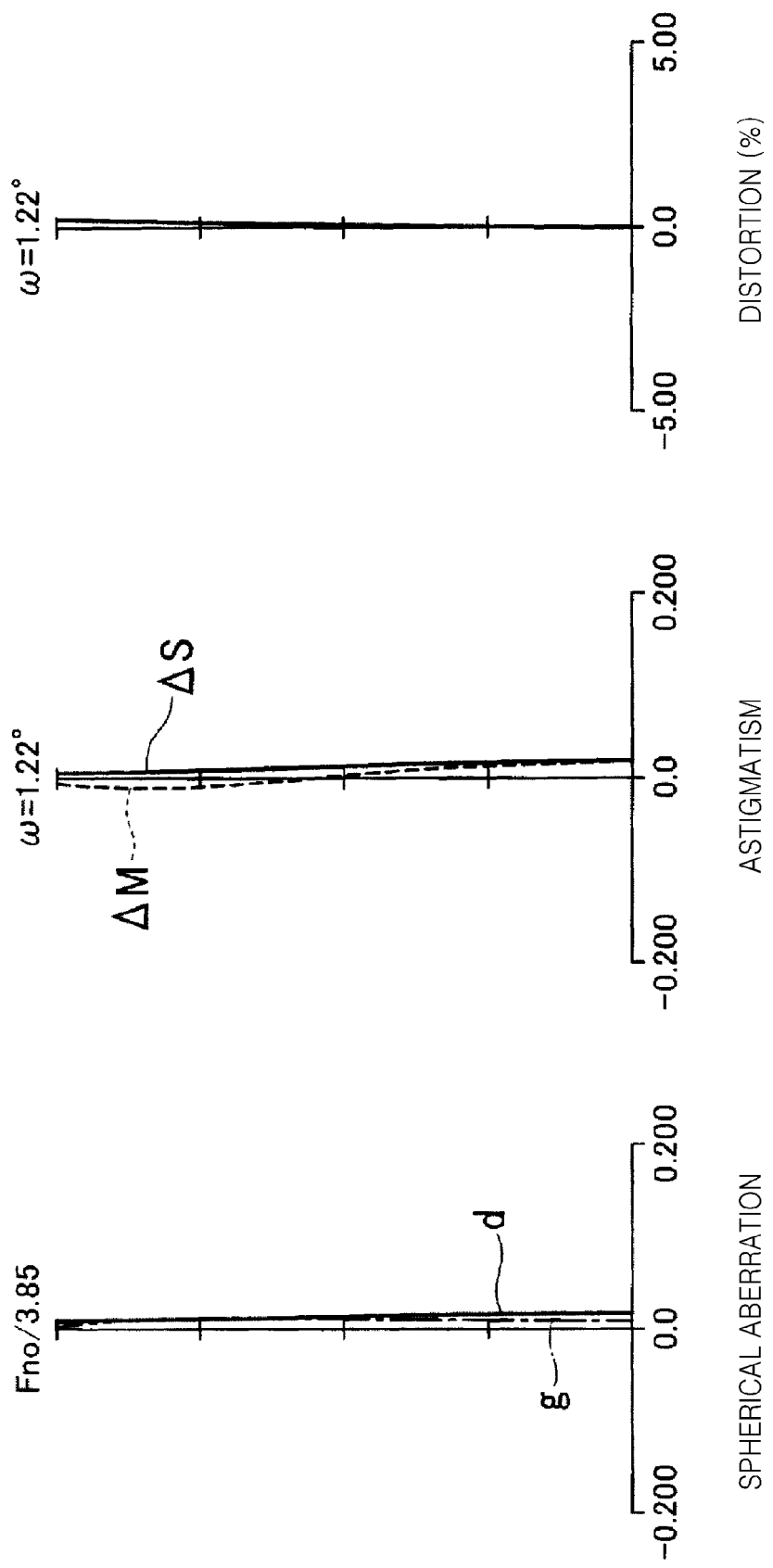
FIG. 9 illustrates graphs showing spherical aberration, astigmatism, and distortion at a telephoto position of the zoom lens according to the embodiment of FIG. 6.

FIG. 7 illustrates graphs showing spherical aberration, astigmatism, and distortion at a wide angle position of the zoom lens according to the current embodiment. FIG. 8 illustrates graphs showing spherical aberration, astigmatism, and distortion at an intermediate position of the zoom lens according to the current embodiment. FIG. 9 illustrates graphs showing spherical aberration, astigmatism, and distortion at a telephoto position of the zoom lens according to the current embodiment.

Descriptions on the spherical aberration, astigmatism, and distortion graphs in FIGS. 7 through 9 are identical to those provided above in connection with FIGS. 3 through 5.

The zoom lens according to the current embodiment satisfies the conditions of Inequalities 1 to 5 and 1' to 5' as shown in Table 2B. The zoom lens according to the current embodiment well compensates each type of aberration as illustrated in FIGS. 7 through 9.

Embodiment 3

Figure 10:
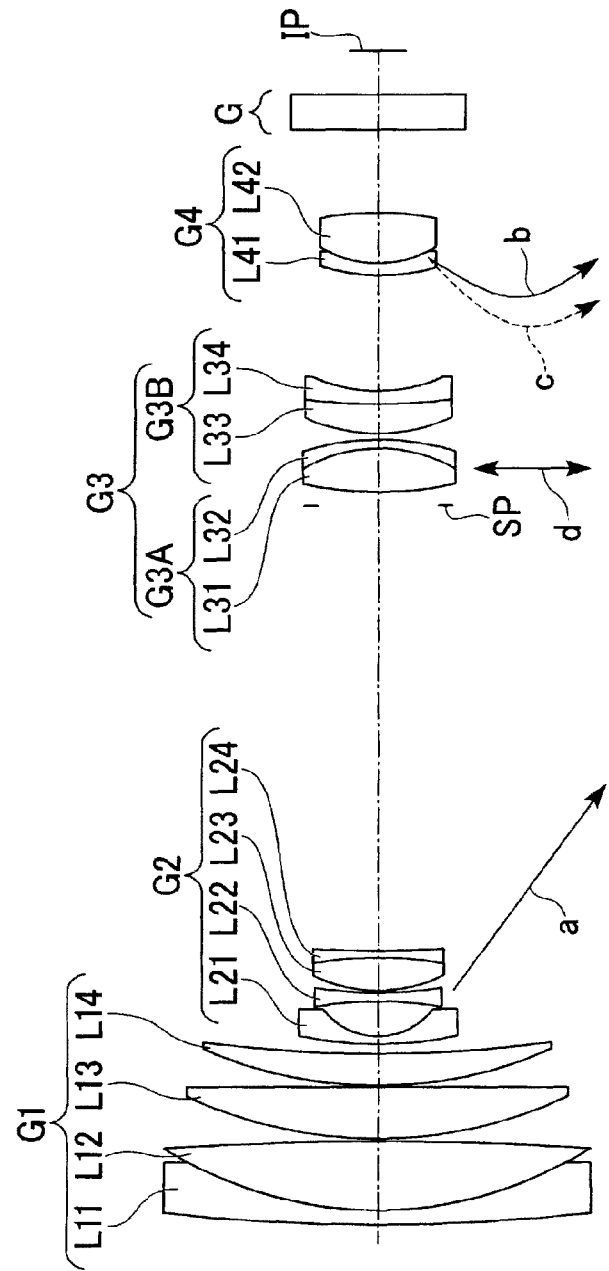
FIG. 10 is a conceptual view showing components of a zoom lens according to still another embodiment of the invention.

FIG. 10 is a conceptual view showing components of a zoom lens according to still another embodiment of the invention.

Referring to FIG. 10, a structure of a zoom lens based on design data of Tables 3, 3A, 3B and 3C is illustrated. The zoom lens illustrated in FIG. 10 has the same structure as that of the zoom lens illustrated in FIG. 1. Descriptions on reference numerals in Tables 3, 3A, 3B and 3C are identical to those provided above in connection with Tables 1, 1A, 1B and 1C.

TABLE 3

| Surface No. | Lens | R | D | Nd | $V_d$ |
|---|---|---|---|---|---|
| 1 | G1R1 | 125.614 | 0.880 | 1.83400 | 37.35 |
| 2 | G1R2/G2R1 | 26.018 | 4.240 | 1.49700 | 81.61 |
| 3 | G2R2 | −224.340 | 0.150 | | |
| 4 | G3R1 | 27.780 | 3.290 | 1.49700 | 81.61 |
| 5 | G3R2 | 717.293 | 0.150 | | |
| 6 | G4R1 | 29.470 | 2.130 | 1.65844 | 50.85 |
| 7 | G4R2 | 75.338 | Variable 1 | | |
| 8 | G5R1 | 23.890 | 0.500 | 1.88300 | 40.81 |
| 9 | G5R2 | 4.380 | 2.222 | | |
| 10 | G6R1 | −17.424 | 0.500 | 1.88300 | 40.81 |
| 11 | G6R2 | 17.424 | 0.194 | | |
| 12 | G7R1 | 9.430 | 1.790 | 1.84666 | 23.78 |
| 13 | G7R2/G8R1 | −18.450 | 0.600 | 1.88300 | 40.81 |
| 14 | G8R2 | 236.506 | Variable 2 | | |
| 15 | Aperture Stop | ∞ | 0.850 | | |
| 16 | G9R1 | 23.372 | 2.940 | 1.58913 | 61.15 |
| 17 | G9R2/G10R1 | −10.213 | 0.690 | 1.84666 | 23.78 |
| 18 | G10R2 | −19.270 | 0.400 | | |
| 19 | G11R1 | 11.066 | 1.700 | 1.84666 | 23.78 |
| 20 | G12R2/G13R1 | 23.495 | 0.680 | 1.88300 | 40.81 |
| 21 | G13R2 | 8.990 | Variable 3 | | |
| 22 | G14R1 | 9.845 | 0.850 | 1.92286 | 20.88 |
| 23 | G14R2/G15R1 | 6.120 | 3.380 | 1.58913 | 61.15 |
| 24 | G15R2 | −17.624 | Variable 4 | | |
| 25 | Flat Surface | ∞ | 2.250 | 1.58633 | 64.14 |
| 26 | Flat Surface | ∞ | 2.780 | | |

TABLE 3A

| Zoom Ratio = 28.26 | Wide Angle Position | Intermediate Position | Telephoto Position |
|---|---|---|---|
| Focal Length | 2.7401 | 11.7739 | 77.4215 |
| Fno | 1.83 | 2.46 | 3.83 |
| Half Angle of View (°) | 30.98 | 7.95 | 1.22 |
| Image Height | 1.6450 | 1.6450 | 1.6450 |
| Total Length of Lens | 75.0544 | 75.0544 | 75.0544 |
| BF | 9.6363 | 13.3233 | 8.4227 |
| Variable 1 | 0.6000 | 17.3630 | 27.8306 |
| Variable 2 | 28.4810 | 11.7178 | 1.2513 |
| Variable 3 | 7.2414 | 3.5761 | 8.4435 |
| Variable 4 | 5.3763 | 9.0417 | 4.1734 |

TABLE 3B

| Inequality | Value |
|---|---|
| (1) $f_{3A}/f_t$ | 0.300 |
| (2) $|f_{3B}/f_3|$ | 4.450 |
| (3) $|f_{12}/f_t|$ | 3.284 |
| (4) $|f_2/f_t|$ | 0.071 |
| (5) $f_4/f_t$ | 0.183 |

TABLE 3C

| Surface No. | 16 | 24 |
|---|---|---|
| R | 23.372 | −17.624 |
| K | 0 | 0 |
| $A_4$ | −3.94E−05 | 7.54E−05 |
| $A_6$ | −1.17E−06 | −4.98E−06 |
| $A_8$ | 3.69E−08 | 1.80E−07 |
| $A_{10}$ | 0.00E+00 | 0.00E+00 |

Figure 11:
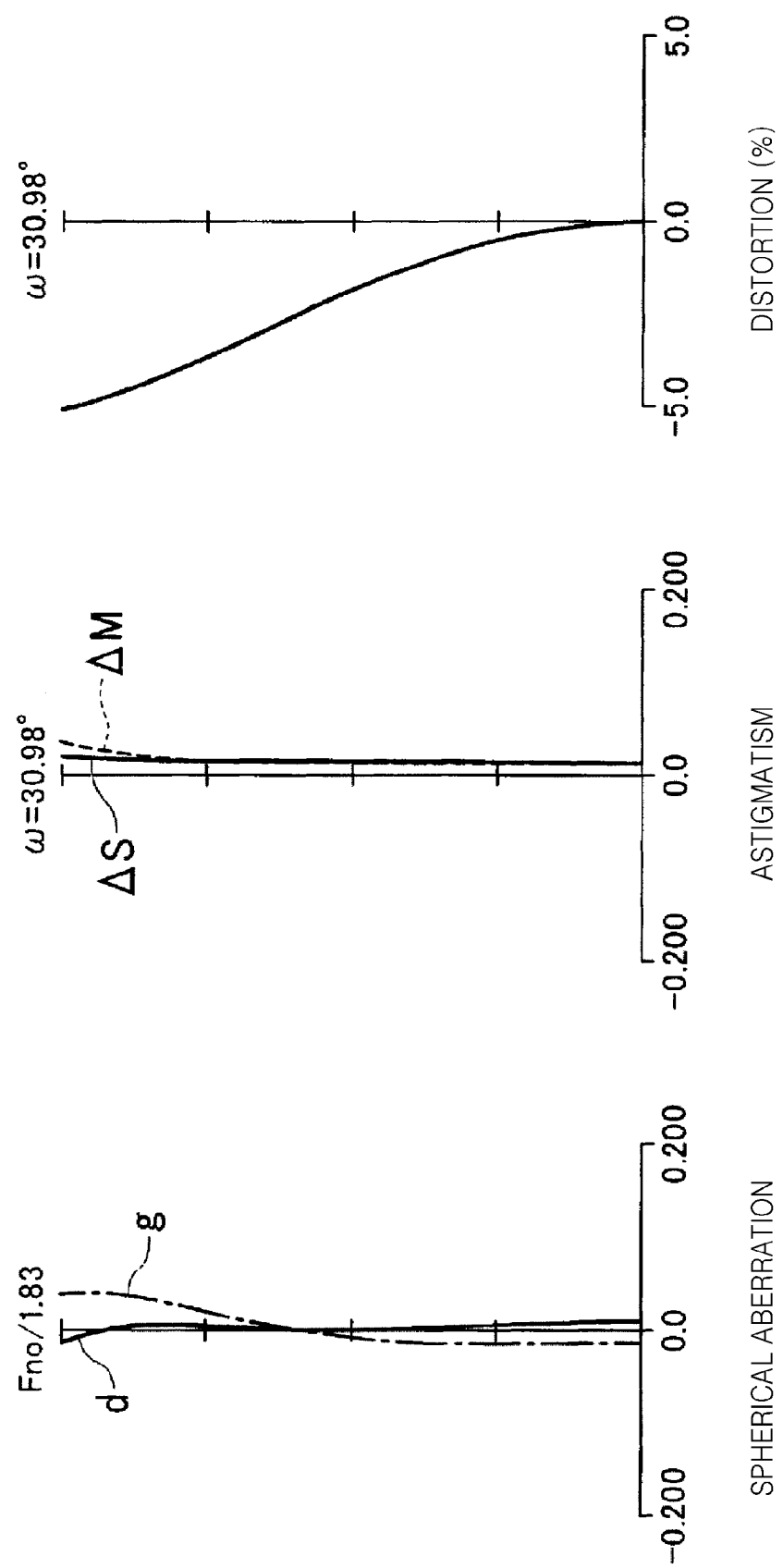
FIG. 11 illustrates graphs showing spherical aberration, astigmatism, and distortion at a wide angle position of the zoom lens according to the embodiment of FIG. 10.
Figure 12:
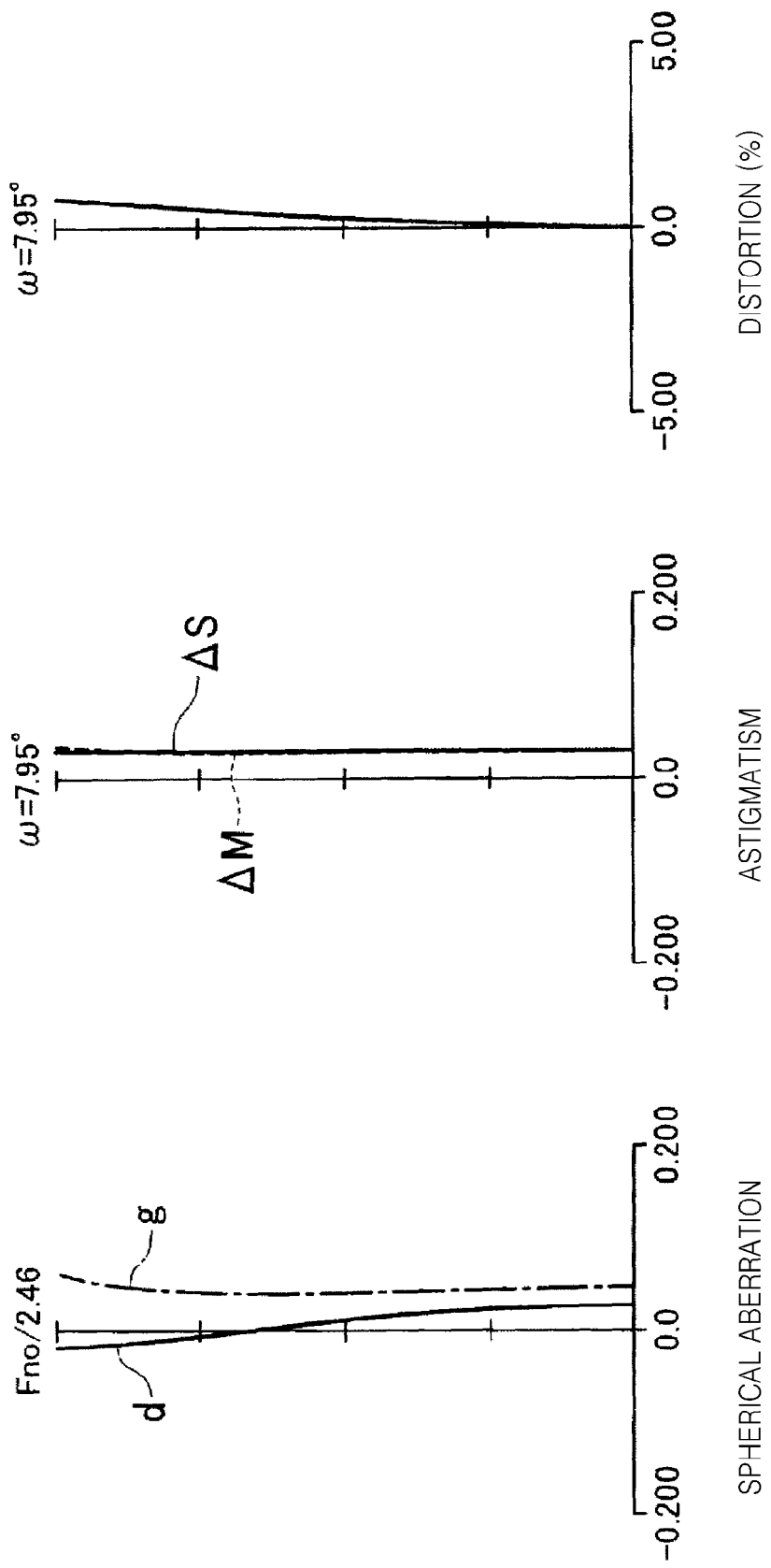
FIG. 12 illustrates graphs showing spherical aberration, astigmatism, and distortion at an intermediate position of the zoom lens according to the embodiment of FIG. 10.
Figure 13:
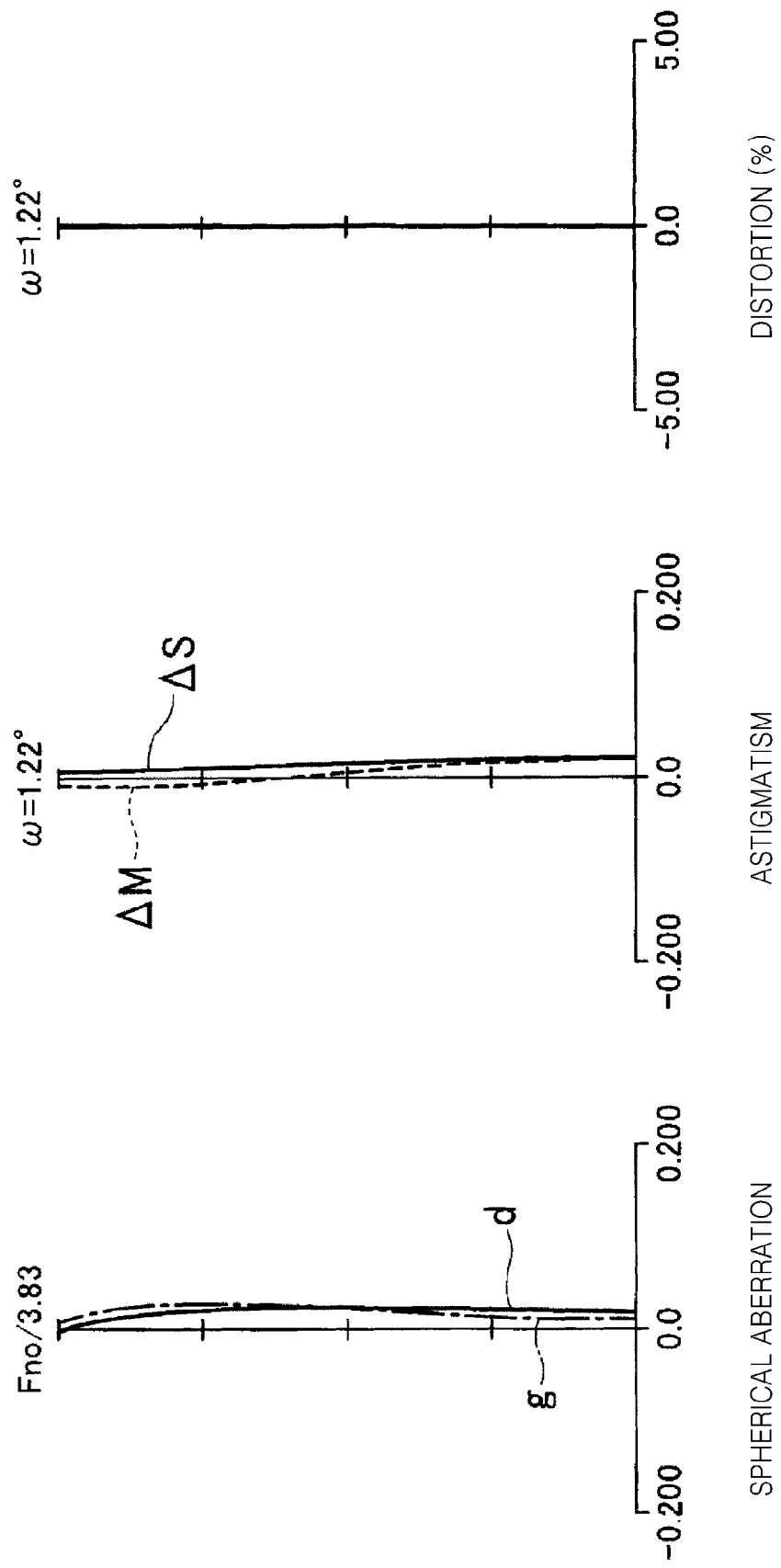
FIG. 13 illustrates graphs showing spherical aberration, astigmatism, and distortion at a telephoto position of the zoom lens according to the embodiment of FIG. 10.

FIG. 11 illustrates graphs showing spherical aberration, astigmatism, and distortion at a wide angle position of the zoom lens according to the current embodiment. FIG. 12 illustrates graphs showing spherical aberration, astigmatism, and distortion at an intermediate position of the zoom lens according to the current embodiment. FIG. 13 illustrates graphs showing spherical aberration, astigmatism, and distortion at a telephoto position of the zoom lens according to the current embodiment.

Descriptions on the spherical aberration, astigmatism, and distortion graphs in FIGS. 11 through 13 are identical to those provided above in connection with FIGS. 3 through 5.

The zoom lens according to the current embodiment satisfies the conditions of Inequalities 1 to 5 and 1' to 5' as shown in Table 3B. The zoom lens according to the current embodiment well compensates each type of aberration as illustrated in FIGS. 11 through 13.

Embodiment 4

Figure 14:
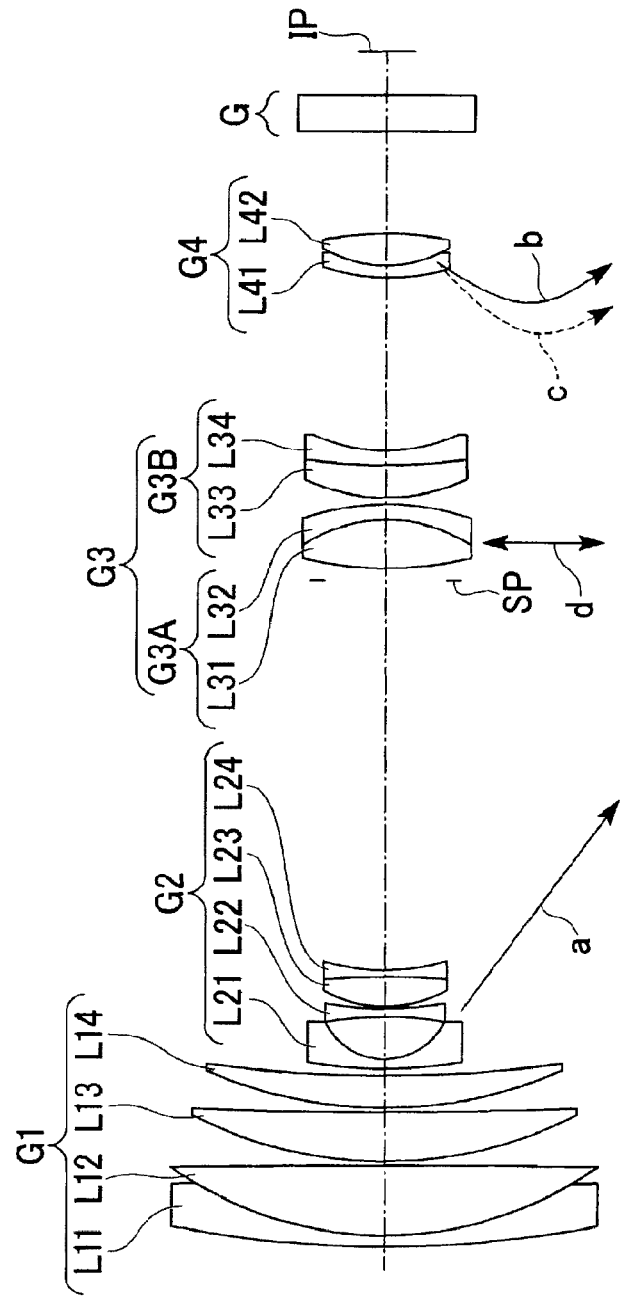
FIG. 14 is a conceptual view showing components of a zoom lens according to a still further embodiment of the invention.

FIG. 14 is a conceptual view showing components of a zoom lens according to a still further of the invention.

Referring to FIG. 14, a structure of a zoom lens based on design data of Tables 4, 4A, 4B and 4C is illustrated. The zoom lens illustrated in FIG. 14 has the same structure as that of the zoom lens illustrated in FIG. 1. Descriptions on reference numerals in Tables 4, 4A, 4B and 4C are identical to those provided above in connection with Tables 1, 1A, 1B and 1C.

TABLE 4

| Surface No. | Lens | R | D | Nd | $V_d$ |
|---|---|---|---|---|---|
| 1 | G1R1 | 68.330 | 0.880 | 1.83400 | 37.35 |
| 2 | G1R2/G2R1 | 24.082 | 4.400 | 1.49700 | 81.61 |
| 3 | G2R2 | −635.890 | 0.150 | | |
| 4 | G3R1 | 25.380 | 3.290 | 1.49700 | 81.61 |
| 5 | G3R2 | 247.027 | 0.150 | | |
| 6 | G4R1 | 26.200 | 2.030 | 1.59283 | 68.62 |
| 7 | G4R2 | 67.840 | Variable 1 | | |
| 8 | G5R1 | 38.900 | 0.500 | 1.88300 | 40.81 |
| 9 | G5R2 | 4.340 | 2.710 | | |
| 10 | G6R1 | −22.560 | 0.500 | 1.88300 | 40.81 |
| 11 | G6R2 | 22.560 | 0.150 | | |
| 12 | G7R1 | 7.875 | 1.820 | 1.92286 | 20.88 |
| 13 | G7R2/G8R1 | −87.190 | 0.500 | 1.88300 | 40.81 |
| 14 | G8R2 | 12.240 | Variable 2 | | |
| 15 | Aperture Stop | ∞ | 0.850 | | |
| 16 | G9R1 | 21.330 | 3.100 | 1.51633 | 64.06 |

TABLE 4-continued

| Surface No. | Lens | R | D | Nd | $V_d$ |
|---|---|---|---|---|---|
| 17 | G9R2/G10R1 | −9.100 | 1.000 | 1.84666 | 23.78 |
| 18 | G10R2 | −14.700 | 0.400 | | |
| 19 | G11R1 | 11.840 | 2.100 | 1.72825 | 28.32 |
| 20 | G12R2/G13R1 | 33.900 | 0.940 | 1.88300 | 40.81 |
| 21 | G13R2 | 10.480 | Variable 3 | | |
| 22 | G14R1 | 10.310 | 0.770 | 1.92286 | 20.88 |
| 23 | G14R2/G15R1 | 6.890 | 2.070 | 1.58913 | 61.15 |
| 24 | G15R2 | −21.090 | Variable 4 | | |
| 25 | Flat Surface | ∞ | 2.250 | 1.58633 | 64.14 |
| 26 | Flat Surface | ∞ | 2.780 | | |

TABLE 4A

| Zoom Ratio = 28.26 | Wide Angle Position | Intermediate Position | Telephoto Position |
|---|---|---|---|
| Focal Length | 2.7400 | 11.7736 | 97.1447 |
| Fno | 1.82 | 2.56 | 4.50 |
| Half Angle of View (°) | 30.98 | 7.95 | 0.97 |
| Image Height | 1.6450 | 1.6450 | 1.6450 |
| Total Length of Lens | 76.2798 | 76.2798 | 76.2798 |
| BF | 10.9466 | 15.9005 | 9.5297 |
| Variable 1 | 0.6000 | 14.9789 | 24.0447 |
| Variable 2 | 24.8174 | 10.4385 | 1.3726 |
| Variable 3 | 10.8444 | 5.8958 | 12.2490 |
| Variable 4 | 6.6780 | 11.6266 | 5.2735 |

TABLE 4B

| Inequality | Value |
|---|---|
| (1) $f_{3A}/f_t$ | 0.230 |
| (2) $|f_{3B}/f_3|$ | 4.500 |
| (3) $|f_{12t}/f_t|$ | 2.500 |
| (4) $|f_2/f_t|$ | 0.044 |
| (5) $f_4/f_t$ | 0.151 |

TABLE 4C

| Surface No. | 16 | 24 |
|---|---|---|
| R | 21.330 | −21.090 |
| K | 0 | 0 |
| $A_4$ | −4.30E−05 | 1.12E−04 |
| $A_6$ | −9.02E−07 | −1.92E−06 |
| $A_8$ | 3.17E−08 | 5.57E−08 |
| $A_{10}$ | 0.00E+00 | 0.00E+00 |

Figure 15:
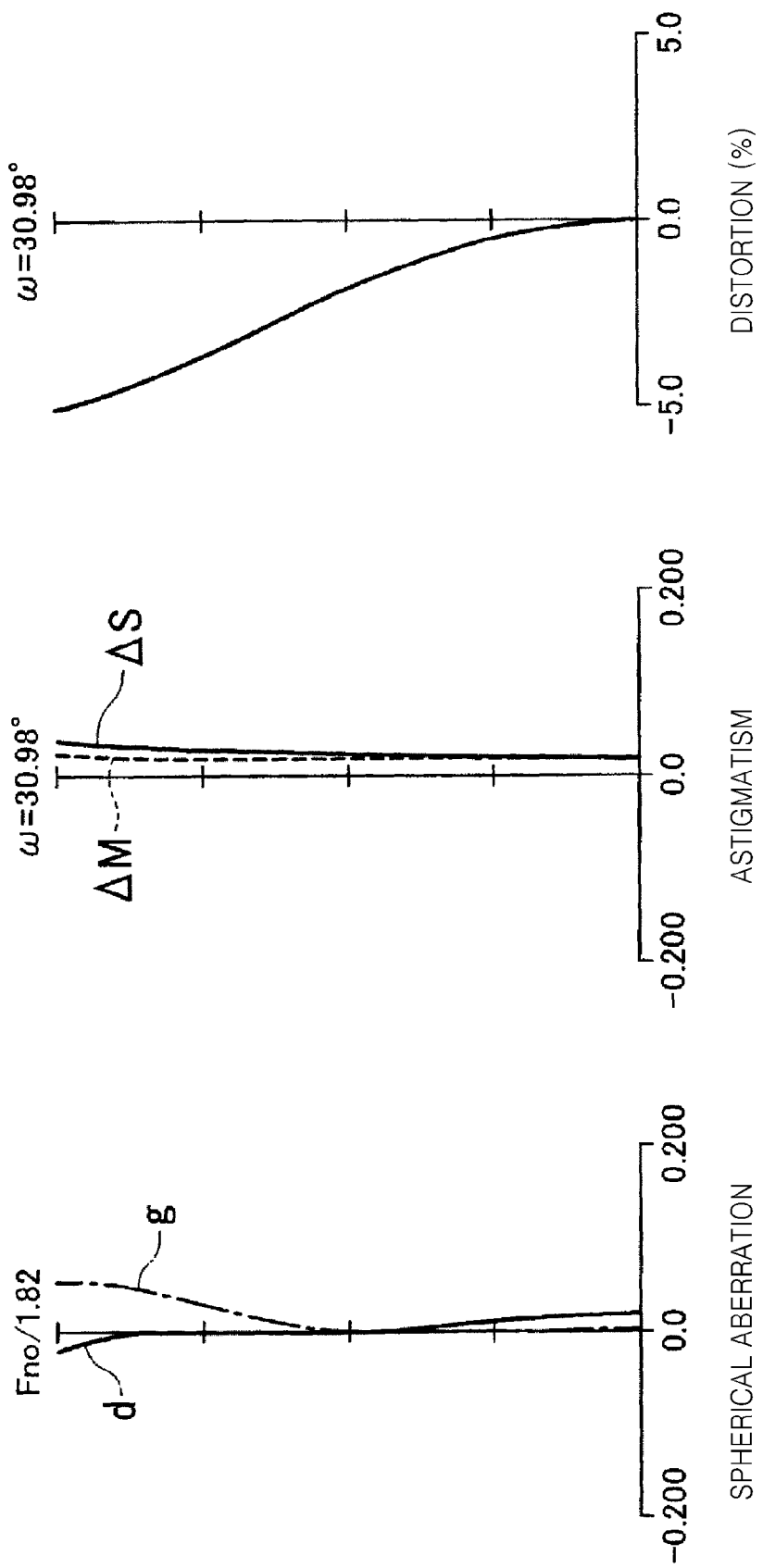
FIG. 15 illustrates graphs showing spherical aberration, astigmatism, and distortion at a wide angle position of the zoom lens according to the embodiment of FIG. 14.
Figure 16:
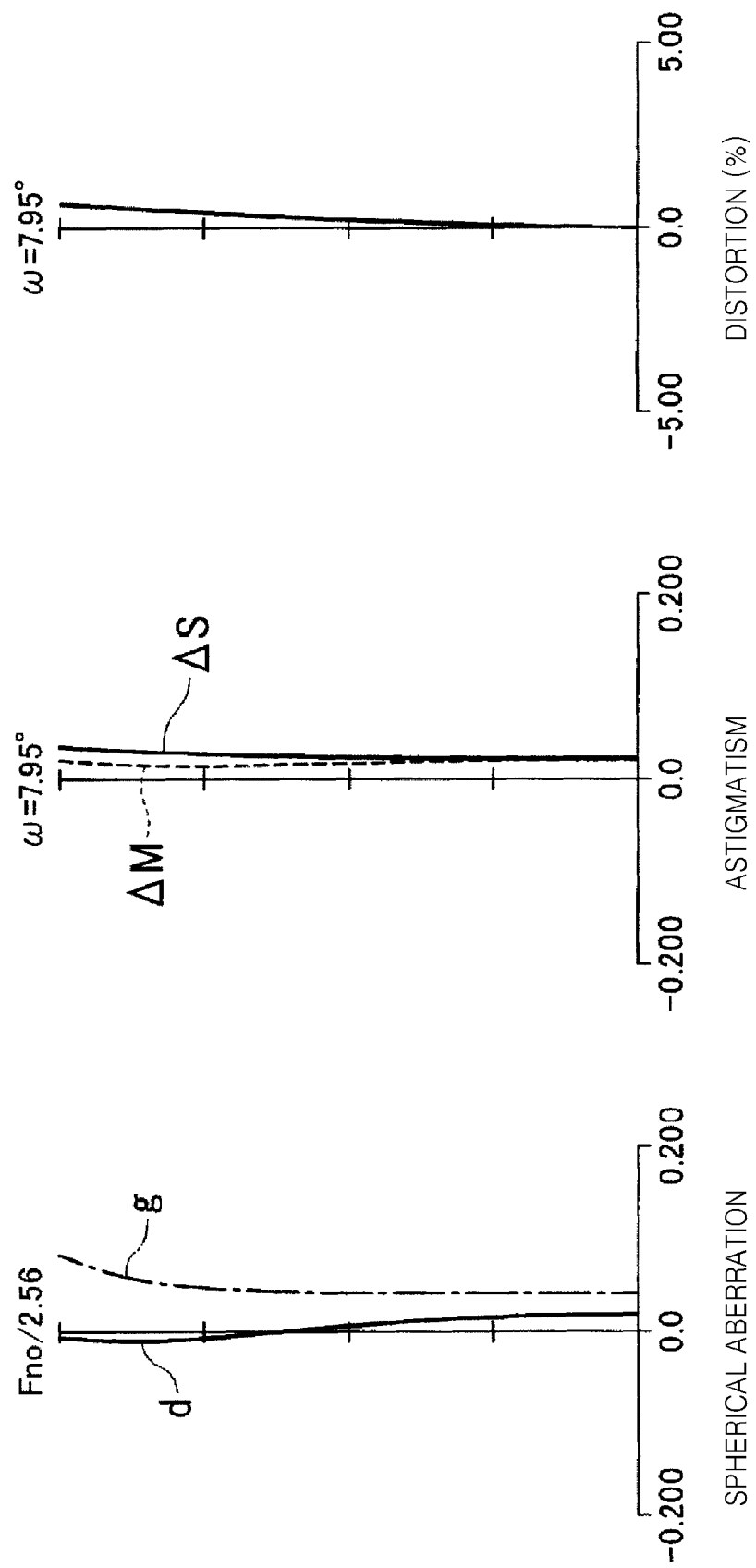
FIG. 16 illustrates graphs showing spherical aberration, astigmatism, and distortion at an intermediate position of the zoom lens according to the embodiment of FIG. 14.
Figure 17:
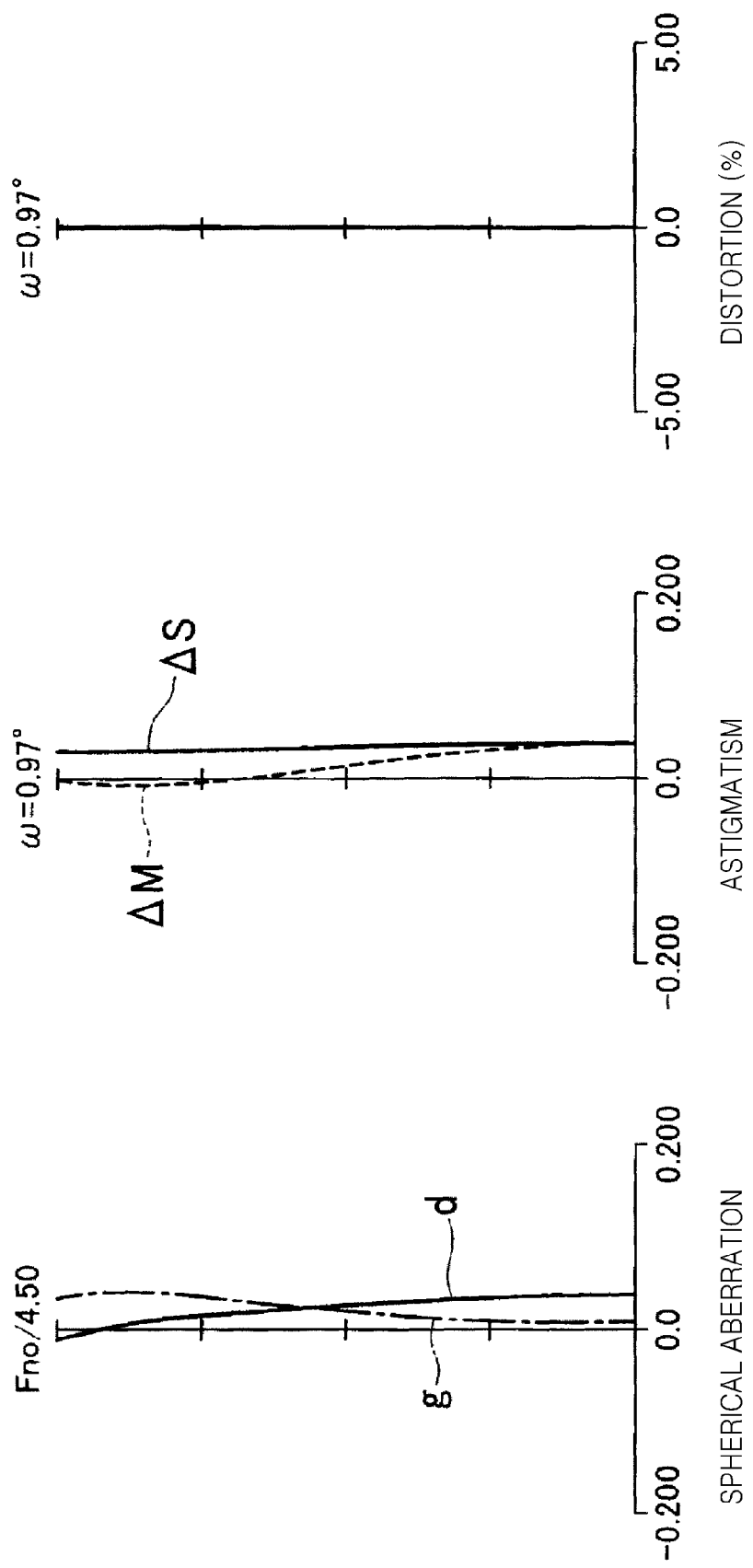
FIG. 17 illustrates graphs showing spherical aberration, astigmatism, and distortion at a telephoto position of the zoom lens according to the embodiment of FIG. 14.

FIG. 15 illustrates graphs showing spherical aberration, astigmatism, and distortion at a wide angle position of the zoom lens according to the current embodiment. FIG. 16 illustrates graphs showing spherical aberration, astigmatism, and distortion at an intermediate position of the zoom lens according to the current embodiment. FIG. 17 illustrates graphs showing spherical aberration, astigmatism, and distortion at a telephoto position of the zoom lens according to the current embodiment.

Descriptions on the spherical aberration, astigmatism, and distortion graphs in FIGS. 15 through 17 are identical to those provided above in connection with FIGS. 3 through 5.

The zoom lens according to the current embodiment satisfies the conditions of Inequalities 1 to 5 and 1' to 5' as shown in Table 4B. The zoom lens according to the current embodiment well compensates each type of aberration as illustrated in FIGS. 15 through 17.

Embodiment 5

Figure 18:
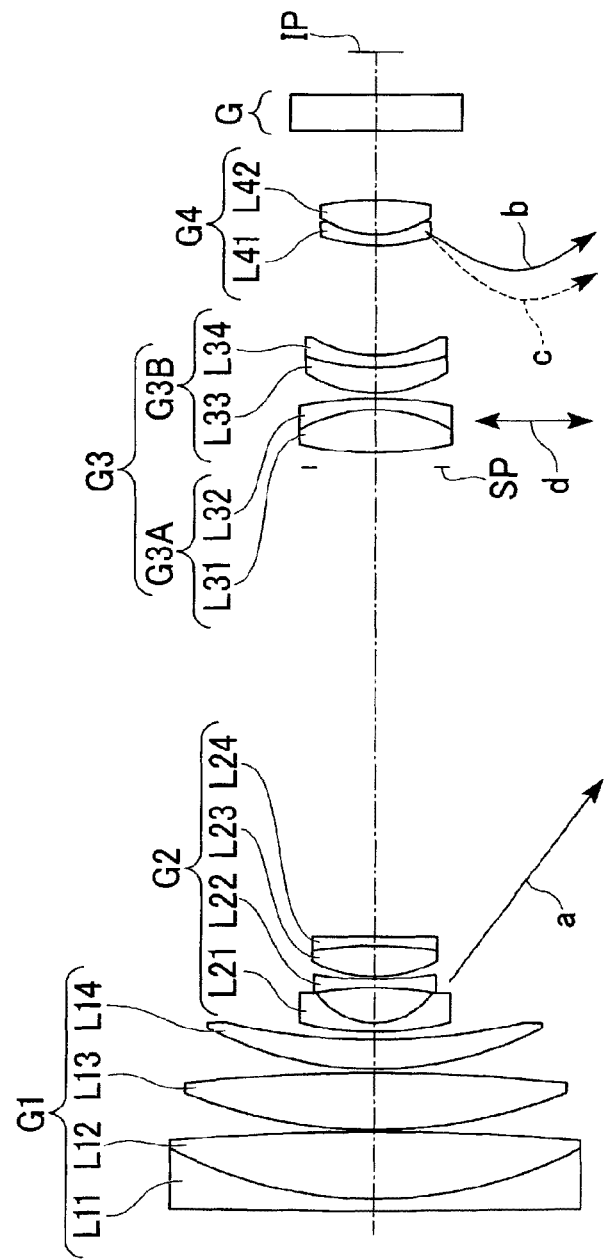
FIG. 18 is a conceptual view showing components of a zoom lens according to an even further embodiment of the invention.

FIG. 18 is a conceptual view showing components of a zoom lens according to an even further embodiment of the invention.

Referring to FIG. 18, a structure of a zoom lens based on design data of Tables 4, 4A, 4B and 4C is illustrated. The zoom lens illustrated in FIG. 18 has the same structure as that of the zoom lens illustrated in FIG. 1. Descriptions on reference numerals in Tables 5, 5A, 5B and 5C are identical to those provided above in connection with Tables 1, 1A, 1B and 1C.

TABLE 5

| Surface No. | Lens | R | D | Nd | $V_d$ |
|---|---|---|---|---|---|
| 1 | G1R1 | 1889.850 | 0.880 | 1.88300 | 40.81 |
| 2 | G1R2/G2R1 | 29.480 | 4.420 | 1.49700 | 81.61 |
| 3 | G2R2 | −135.930 | 0.150 | | |
| 4 | G3R1 | 34.710 | 3.820 | 1.49700 | 81.61 |
| 5 | G3R2 | −92.230 | 0.150 | | |
| 6 | G4R1 | 24.334 | 1.950 | 1.63850 | 55.45 |
| 7 | G4R2 | 46.140 | Variable 1 | | |
| 8 | G5R1 | 21.110 | 0.500 | 1.88300 | 40.81 |
| 9 | G5R2 | 4.640 | 2.344 | | |
| 10 | G6R1 | −15.470 | 0.500 | 1.88300 | 40.81 |
| 11 | G6R2 | 15.470 | 0.247 | | |
| 12 | G7R1 | 10.426 | 2.020 | 1.84666 | 23.78 |
| 13 | G7R2/G8R1 | −22.256 | 0.600 | 1.69680 | 55.45 |
| 14 | G8R2 | −201.880 | Variable 2 | | |
| 15 | Aperture Stop | ∞ | 0.850 | | |
| 16 | G9R1 | 17.570 | 2.890 | 1.58913 | 61.15 |
| 17 | G9R2/G10R1 | −10.600 | 0.690 | 1.84666 | 23.78 |
| 18 | G10R2 | −21.430 | 0.400 | | |
| 19 | G11R1 | 9.050 | 1.750 | 1.80518 | 25.45 |
| 20 | G12R2/G13R1 | 16.020 | 0.730 | 1.88300 | 40.81 |
| 21 | G13R2 | 7.470 | Variable 3 | | |
| 22 | G14R1 | 9.890 | 0.780 | 1.92286 | 20.88 |
| 23 | G14R2/G15R1 | 6.220 | 2.290 | 1.58913 | 61.15 |
| 24 | G15R2 | −21.470 | Variable 4 | | |
| 25 | Flat Surface | ∞ | 2.250 | 1.58633 | 64.14 |
| 26 | Flat Surface | ∞ | 2.780 | | |

TABLE 5A

| Zoom Ratio = 28.26 | Wide Angle Position | Intermediate Position | Telephoto Position |
|---|---|---|---|
| Focal Length | 2.7400 | 11.7788 | 77.4200 |
| Fno | 1.83 | 2.38 | 3.88 |
| Half Angle of View (°) | 30.98 | 7.95 | 1.22 |
| Image Height | 1.6450 | 1.6450 | 1.6450 |
| Total Length of Lens | 76.2252 | 76.2252 | 76.2252 |
| BF | 9.0085 | 12.7330 | 7.6040 |
| Variable 1 | 0.6000 | 18.8597 | 30.1255 |
| Variable 2 | 30.7760 | 12.5163 | 1.2504 |
| Variable 3 | 7.1463 | 3.4531 | 8.6018 |
| Variable 4 | 4.7126 | 8.4058 | 3.2572 |

TABLE 5B

| Inequality | Value |
|---|---|
| (1) $f_{3A}/f_t$ | 0.271 |
| (2) $|f_{3B}/f_3|$ | 4.500 |
| (3) $|f_{12t}/f_t|$ | 3.498 |
| (4) $|f_2/f_t|$ | 0.078 |
| (5) $f_4/f_t$ | 0.195 |

TABLE 5C

| Surface No. | 16 | 24 |
|---|---|---|
| R | 17.570 | −21.470 |
| K | 0 | 0 |
| $A_4$ | −1.19E−05 | 7.81E−05 |
| $A_6$ | −3.12E−06 | −5.47E−06 |
| $A_8$ | 8.65E−08 | 2.28E−07 |
| $A_{10}$ | 0.00E+00 | 0.00E+00 |

Figure 19:
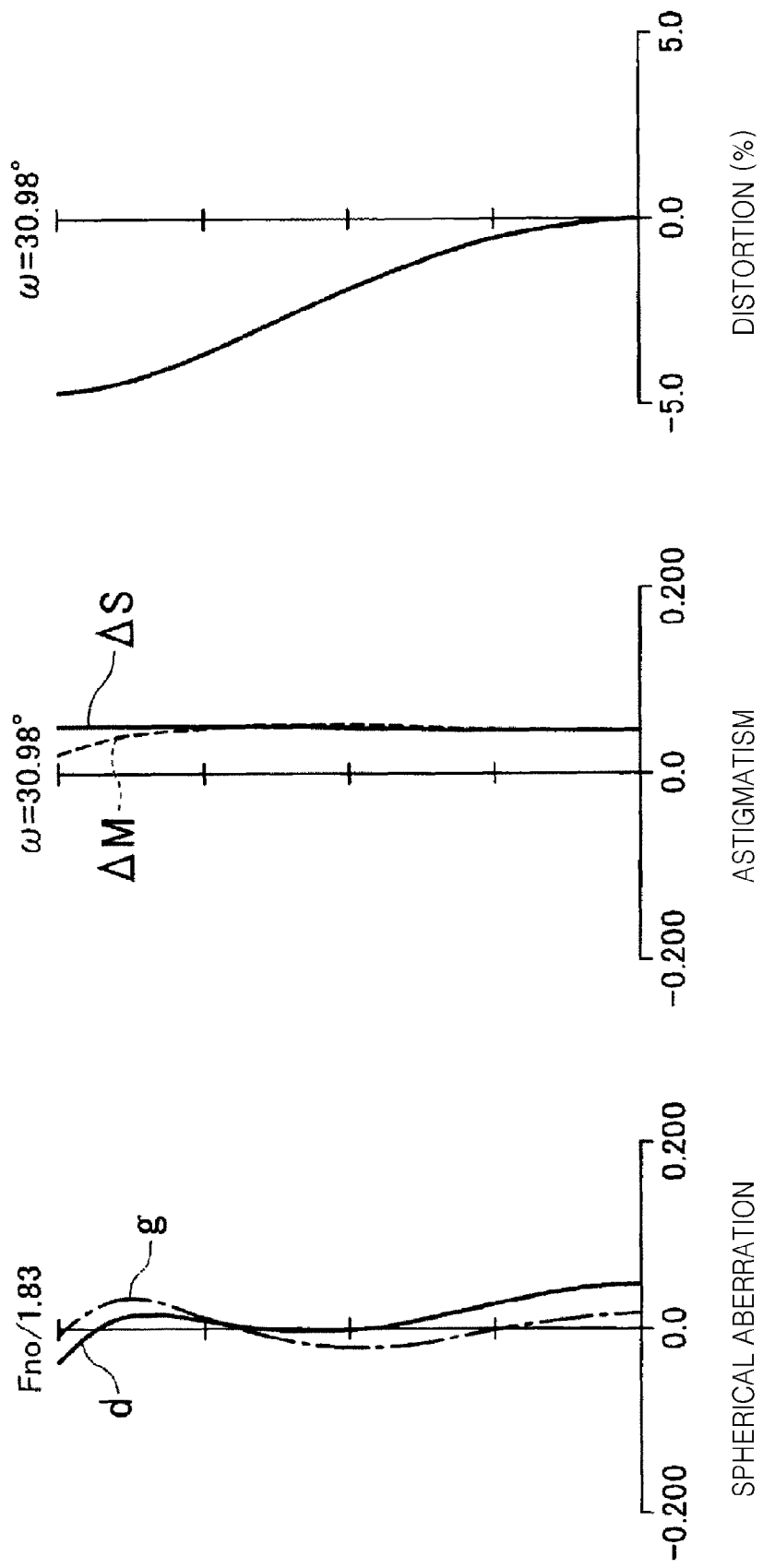
FIG. 19 illustrates graphs showing spherical aberration, astigmatism, and distortion at a wide angle position of the zoom lens according to the embodiment of FIG. 18.
Figure 20:
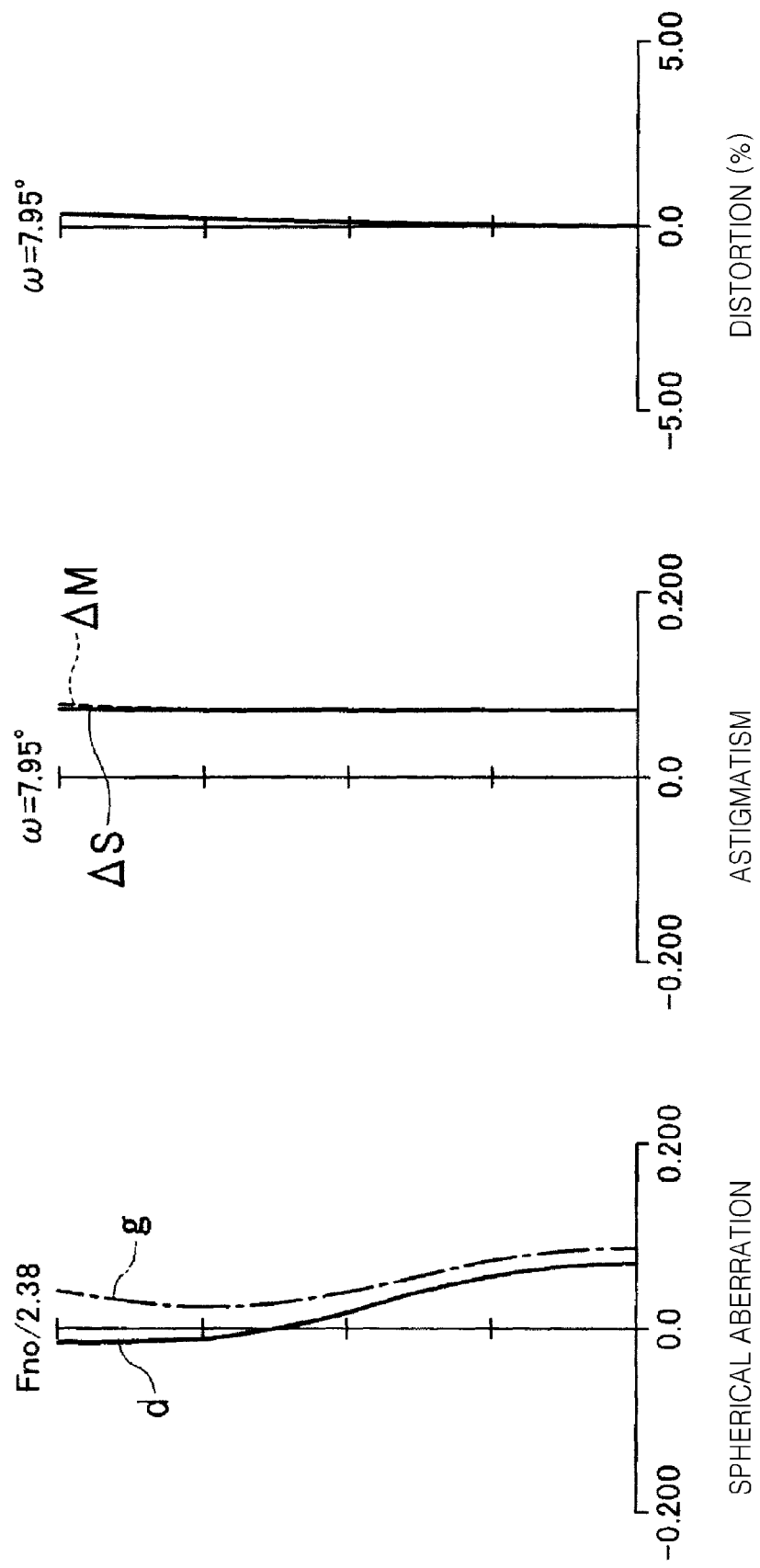
FIG. 20 illustrates graphs showing spherical aberration, astigmatism, and distortion at an intermediate position of the zoom lens according to the embodiment of FIG. 18.
Figure 21:
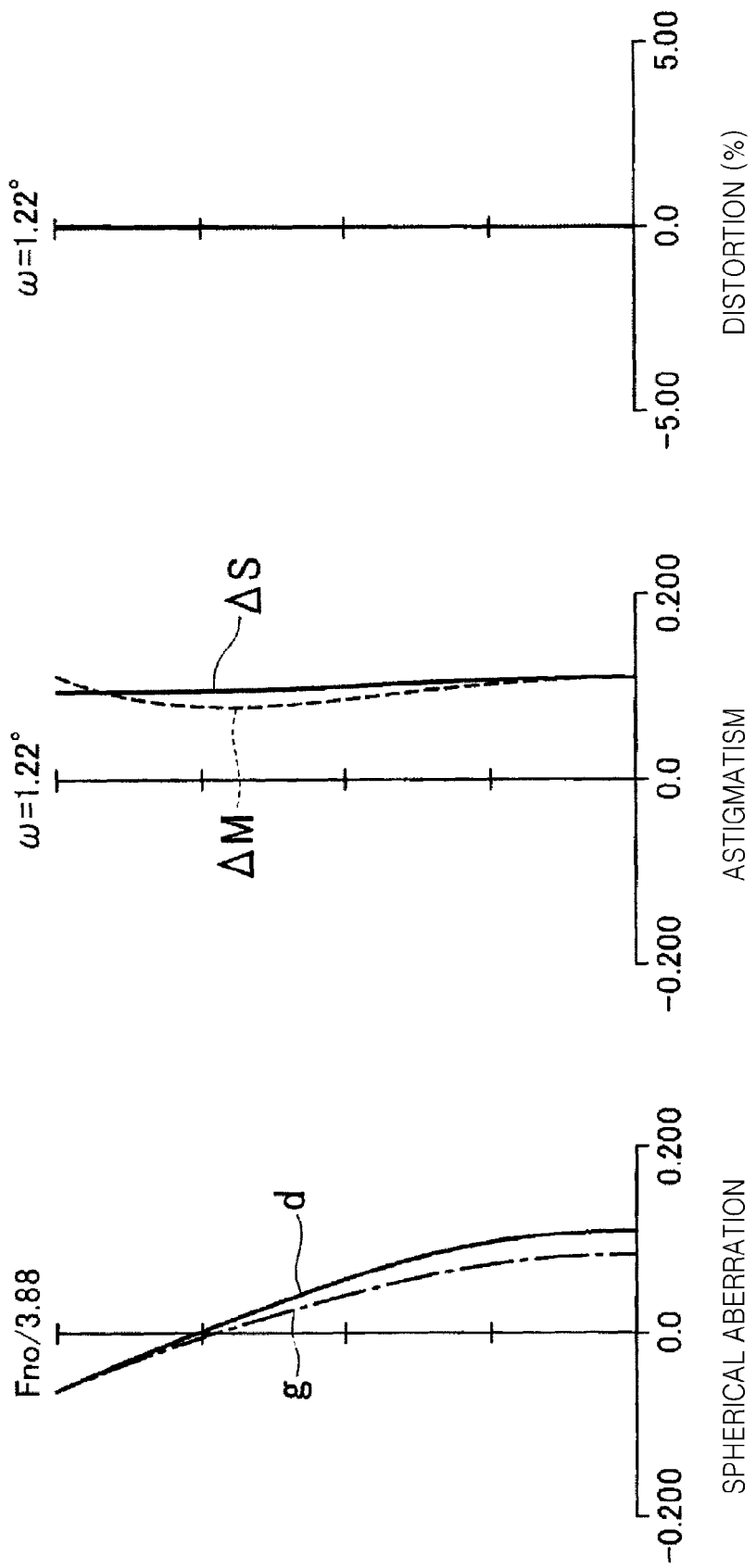
FIG. 21 illustrates graphs showing spherical aberration, astigmatism, and distortion at a telephoto position of the zoom lens according to the embodiment of FIG. 18.

FIG. 19 illustrates graphs showing spherical aberration, astigmatism, and distortion at a wide angle position of the zoom lens according to the current embodiment. FIG. 20 illustrates graphs showing spherical aberration, astigmatism, and distortion at an intermediate position of the zoom lens according to the current embodiment. FIG. 21 illustrates graphs showing spherical aberration, astigmatism, and distortion at a telephoto position of the zoom lens according to the current embodiment.

Descriptions on the spherical aberration, astigmatism, and distortion graphs in FIGS. 19 through 21 are identical to those provided above in connection with FIGS. 3 through 5.

The zoom lens according to the current embodiment satisfies the conditions of Inequalities 1 to 5 and 1' to 5' as shown in Table 5B. The zoom lens according to the current embodiment well compensates each type of aberration as illustrated in FIGS. 19 through 21.

According to the invention, a compact zoom lens having a large zoom ratio and capable of achieving high optical performance by compensating a variation in an image plane caused by zooming and aberration generated when an image blur is compensated, and a photographing apparatus including the zoom lens may be provided.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional aspects may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A zoom lens comprising:
a first lens group having a positive refractive power;
a second lens group disposed in back of the first lens group, having a negative refractive power, and selectively moveable in an optical axis direction to perform zooming;
a third lens group disposed in back of the second lens group, having a positive refractive power, and comprising:
a third-A lens group comprising a doublet lens formed by bonding a positive lens to a negative lens, selectively moveable in a direction perpendicular to the optical axis direction to compensate for an image blur, and having a positive refractive power, wherein a lens surface of the doublet lens closest to the object side is aspheric; and
a third-B lens group disposed in back of the third-A lens group and comprising at least one positive lens and at least one negative lens;
a fourth lens group disposed in back of the third lens group, having a positive refractive power, and selectively moveable in the optical axis direction to compensate a variation in an image plane caused by the zooming and to perform focusing; and
an aperture stop disposed between the second and third lens groups.

2. A zoom lens of comprising:
a first lens group having a positive refractive power;
a second lens group disposed in back of the first lens group, having a negative refractive power, and selectively moveable in an optical axis direction to perform zooming;
a third lens group disposed in back of the second lens group, having a positive refractive power, and comprising:
a third-A lens group comprising a doublet lens formed by bonding a positive lens to a negative lens and having at least one aspherical surface, selectively moveable in a direction perpendicular to the optical axis direction to compensate for an image blur, and having a positive refractive power; and
a third-B lens group disposed in back of the third-A lens group and comprising at least one positive lens and at least one negative lens;
a fourth lens group disposed in back of the third lens group, having a positive refractive power, and selectively moveable in the optical axis direction to compensate a variation in an image plane caused by the zooming and to perform focusing; and
an aperture stop disposed between the second and third lens groups,
wherein, if a focal length of the third-A lens group is $f_{3A}$, a focal length of the third-B lens group is $f_{3B}$, a focal length of the third lens group is $f_3$, and an overall focal length of the zoom lens at a telephoto position is $f_t$, the zoom lens satisfies the following inequalities:

$0.15 < f_{3A}/f_t < 0.35$; and $1.2 < |f_{3B}/f_3| < 6.0$.

3. A zoom lens comprising:

a first lens group having a positive refractive power;

a second lens group disposed in back of the first lens group, having a negative refractive power, and selectively moveable in an optical axis direction to perform zooming;

a third lens group disposed in back of the second lens group, having a positive refractive power, and comprising:

a third-A lens group comprising a doublet lens formed by bonding a positive lens to a negative lens and having at least one aspherical surface, selectively moveable in a direction perpendicular to the optical axis direction to compensate for an image blur, and having a positive refractive power; and a third-B lens group disposed in back of the third-A lens group and comprising at least one positive lens and at least one negative lens;

a fourth lens group disposed in back of the third lens group, having a positive refractive power, and selectively moveable in the optical axis direction to compensate a variation in an image plane caused by the zooming and to perform focusing; and an aperture stop disposed between the second and third lens groups, wherein, if the first lens group comprises at least one negative lens and at least three positive lens, the second lens group comprises at least three negative lenses and at least one positive lens, a combined focal length of the first and second lens groups at a telephoto position is $f_{12t}$, and an overall focal length of the zoom lens at the telephoto position is $f_t$, the zoom lens satisfies the following inequality:

$2.0 < |f_{12t}/f_t| < 4.0$.

4. A zoom lens comprising:

a first lens group having a positive refractive power;

a second lens group disposed in back of the first lens group, having a negative refractive power, and selectively moveable in an optical axis direction to perform zooming;

a third lens group disposed in back of the second lens group, having a positive refractive power, and comprising:

a third-A lens group comprising a doublet lens formed by bonding a positive lens to a negative lens and having at least one aspherical surface, selectively moveable in a direction perpendicular to the optical axis direction to compensate for an image blur, and having a positive refractive power; and a third-B lens group disposed in back of the third-A lens group and comprising at least one positive lens and at least one negative lens;

a fourth lens group disposed in back of the third lens group, having a positive refractive power, and selectively moveable in the optical axis direction to compensate a variation in an image plane caused by the zooming and to perform focusing; and an aperture stop disposed between the second and third lens groups, wherein at least one positive lens of the first lens group has an Abbe number equal to or greater than 80.

5. A zoom lens comprising:

a first lens group having a positive refractive power;

a second lens group disposed in back of the first lens group, having a negative refractive power, and selectively moveable in an optical axis direction to perform zooming;

a third lens group disposed in back of the second lens group, having a positive refractive power, and comprising:

a third-A lens group comprising a doublet lens formed by bonding a positive lens to a negative lens and having at least one aspherical surface, selectively moveable in a direction perpendicular to the optical axis direction to compensate for an image blur, and having a positive refractive power; and a third-B lens group disposed in back of the third-A lens group and comprising at least one positive lens and at least one negative lens;

a fourth lens group disposed in back of the third lens group, having a positive refractive power, and selectively moveable in the optical axis direction to compensate a variation in an image plane caused by the zooming and to perform focusing; and an aperture stop disposed between the second and third lens groups, wherein, if the fourth lens group comprises a doublet lens formed by bonding a negative lens to a positive lens disposed in back of the negative lens, a focal length of the second lens group is $f_2$, a focal length of the fourth lens group is $f_4$, an overall focal length of the zoom lens at a telephoto position is $f_t$, the zoom lens satisfies the following inequalities:

$0.02 < |f_2/f_t| < 0.1$; and $0.15 < f_4/f_t < 0.3$.

6. A photographing apparatus comprising:

a zoom lens; and a solid-state imaging device for converting an optical signal formed by the zoom lens into an electrical signal, the zoom lens comprising:

a first lens group having a positive refractive power;

a second lens group disposed in back of the first lens group, having a negative refractive power, and selectively moveable in an optical axis direction to perform zooming;

a third lens group disposed in back of the second lens group, having a positive refractive power, and comprising:

a third-A lens group comprising a doublet lens formed by bonding a positive lens to a negative lens, selectively moveable in a direction perpendicular to the optical axis direction to compensate for an image blur, and having a positive refractive power, wherein a lens surface of the doublet lens closest to the object side is aspheric; and a third-B lens group disposed in back of the third-A lens group and comprising at least one positive lens and at least one negative lens;

a fourth lens group disposed in back of the third lens group, having a positive refractive power, and selectively moveable in the optical axis direction to compensate a variation in an image plane caused by the zooming and to perform focusing; and an aperture stop disposed between the second and third lens groups.

7. A photographing apparatus comprising:

a zoom lens; and a solid-state imaging device for converting an optical signal formed by the zoom lens into an electrical signal,
the zoom lens comprising:
  a first lens group having a positive refractive power;
  a second lens group disposed in back of the first lens group, having a negative refractive power, and selectively moveable in an optical axis direction to perform zooming;
  a third lens group disposed in back of the second lens group, having a positive refractive power, and comprising:
    a third-A lens group comprising a doublet lens formed by bonding a positive lens to a negative lens and having at least one aspherical surface, selectively moveable in a direction perpendicular to the optical axis direction to compensate for an image blur, and having a positive refractive power; and
    a third-B lens group disposed in back of the third-A lens group and comprising at least one positive lens and at least one negative lens;
  a fourth lens group disposed in back of the third lens group, having a positive refractive power, and selectively moveable in the optical axis direction to compensate a variation in an image plane caused by the zooming and to perform focusing; and
  an aperture stop disposed between the second and third lens groups,
wherein, if a focal length of the third-A lens group is $f_{3A}$, a focal length of the third-B lens group is $f_{3B}$, a focal length of the third lens group is $f_3$, and an overall focal length of the zoom lens at a telephoto position is $f_t$, the zoom lens satisfies the following inequalities:

$0.15 < f_{3A}/f_t < 0.35$; and $1.2 < |f_{3B}/f_3| < 6.0$.

8. A photographing apparatus comprising:
a zoom lens; and
a solid-state imaging device for converting an optical signal formed by the zoom lens into an electrical signal,
the zoom lens comprising:
  a first lens group having a positive refractive power;
  a second lens group disposed in back of the first lens group, having a negative refractive power, and selectively moveable in an optical axis direction to perform zooming;
  a third lens group disposed in back of the second lens group, having a positive refractive power, and comprising:
    a third-A lens group comprising a doublet lens formed by bonding a positive lens to a negative lens and having at least one aspherical surface, selectively moveable in a direction perpendicular to the optical axis direction to compensate for an image blur, and having a positive refractive power; and
    a third-B lens group disposed in back of the third-A lens group and comprising at least one positive lens and at least one negative lens;
  a fourth lens group disposed in back of the third lens group, having a positive refractive power, and selectively moveable in the optical axis direction to compensate a variation in an image plane caused by the zooming and to perform focusing; and
an aperture stop disposed between the second and third lens groups,
wherein, if the first lens group comprises at least one negative lens and at least three positive lens, the second lens group comprises at least three negative lenses and at least one positive lens, a combined focal length of the first and second lens groups at a telephoto position is $f_{12t}$, and an overall focal length of the zoom lens at the telephoto position is $f_t$, the zoom lens satisfies the following inequality:

$2.0 < |f_{12t}/f_t| < 4.0$.

9. A photographing apparatus comprising:
a zoom lens; and
a solid-state imaging device for converting an optical signal formed by the zoom lens into an electrical signal,
the zoom lens comprising:
  a first lens group having a positive refractive power;
  a second lens group disposed in back of the first lens group, having a negative refractive power, and selectively moveable in an optical axis direction to perform zooming;
  a third lens group disposed in back of the second lens group, having a positive refractive power, and comprising:
    a third-A lens group comprising a doublet lens formed by bonding a positive lens to a negative lens and having at least one aspherical surface, selectively moveable in a direction perpendicular to the optical axis direction to compensate for an image blur, and having a positive refractive power; and
    a third-B lens group disposed in back of the third-A lens group and comprising at least one positive lens and at least one negative lens;
  a fourth lens group disposed in back of the third lens group, having a positive refractive power, and selectively moveable in the optical axis direction to compensate a variation in an image plane caused by the zooming and to perform focusing; and
an aperture stop disposed between the second and third lens groups,
wherein at least one positive lens of the first lens group has an Abbe number equal to or greater than 80.

10. A photographing apparatus comprising:
a zoom lens; and
a solid-state imaging device for converting an optical signal formed by the zoom lens into an electrical signal,
the zoom lens comprising:
  a first lens group having a positive refractive power;
  a second lens group disposed in back of the first lens group, having a negative refractive power, and selectively moveable in an optical axis direction to perform zooming;
  a third lens group disposed in back of the second lens group, having a positive refractive power, and comprising:
    a third-A lens group comprising a doublet lens formed by bonding a positive lens to a negative lens and having at least one aspherical surface, selectively moveable in a direction perpendicular to the optical axis direction to compensate for an image blur, and having a positive refractive power; and
    a third-B lens group disposed in back of the third-A lens group and comprising at least one positive lens and at least one negative lens;
  a fourth lens group disposed in back of the third lens group, having a positive refractive power, and selectively moveable in the optical axis direction to compensate a variation in an image plane caused by the zooming and to perform focusing; and an aperture stop disposed between the second and third lens groups, wherein, if the fourth lens group comprises a doublet lens formed by bonding a negative lens to a positive lens disposed in back of the negative lens, a focal length of the second lens group is $f_2$, a focal length of the fourth lens group is $f_4$, an overall focal length of the zoom lens at a telephoto position is $f_t$, the zoom lens satisfies the following inequalities:

$0.02<|f_2/f_t|<0.1$; and $0.15<f_4/f_t<0.3$.

* * * * *